US012503899B2

(12) United States Patent
Caione et al.

(10) Patent No.: US 12,503,899 B2
(45) Date of Patent: Dec. 23, 2025

(54) DOOR-CLOSING DEVICE FOR REFRIGERATION CABINETS

(71) Applicant: CISAPLAST S.P.A., Suzzara (IT)

(72) Inventors: Stefano Caione, Curtatone (IT); Enrico Paroli, Curtatone (IT)

(73) Assignee: CISAPLAST S.P.A., Suzzara (IT)

( * ) Notice: Subject to any disclaimer, the term of this patent is extended or adjusted under 35 U.S.C. 154(b) by 0 days.

(21) Appl. No.: 18/714,258

(22) PCT Filed: Nov. 24, 2022

(86) PCT No.: PCT/IB2022/061391
§ 371 (c)(1),
(2) Date: May 29, 2024

(87) PCT Pub. No.: WO2023/100041
PCT Pub. Date: Jun. 8, 2023

(65) Prior Publication Data

US 2025/0020012 A1 Jan. 16, 2025

(30) Foreign Application Priority Data

Dec. 3, 2021 (IT) ........................ 102021000030665

(51) Int. Cl.
*E05F 1/10* (2006.01)
*F25D 23/02* (2006.01)

(52) U.S. Cl.
CPC ......... *E05F 1/1091* (2013.01); *E05Y 2900/31* (2013.01); *F25D 23/028* (2013.01); *F25D 2323/024* (2013.01)

(58) Field of Classification Search
CPC .............. E05F 1/1091; F25D 2323/024; F25D 23/028; E05D 7/02
See application file for complete search history.

(56) References Cited

U.S. PATENT DOCUMENTS 4,430,770 A * 2/1984 Niekrasz ............... E05F 1/1292 16/349
6,442,799 B1 * 9/2002 Duarte .................... E04H 4/084 16/377

(Continued)

FOREIGN PATENT DOCUMENTS

| | | | |
|---|---|---|---|
| EP | 3366164 | A1 | 8/2018 |
| JP | H06263186 | A | 9/1994 |

*Primary Examiner* — Jeffrey O'Brien
(74) *Attorney, Agent, or Firm* — FisherBroyles, LLP; Roger L. Browdy; Ronni S. Jillions

(57) ABSTRACT

A door-closing device (45, 450) for refrigeration cabinets (10) provided with a wing (30) hinged to a refrigerated compartment (15) is described, said door-closing device (45, 450) comprising: a first fixing bracket (75, 750) adapted to be fixed to the compartment (15), a second fixing bracket (180) adapted to be fixed to the wing (30), a pin (115) rotatably associated with the first plate with respect to a rotation axis (R) and to which the second bracket (180) is rotationally integral, an elastic element (60), which develops longitudinally along a longitudinal axis, is provided with a first axial end (50) and an opposite second axial end (55) and exerts an elastic force along said longitudinal axis. Wherein the first axial end (50) is hinged to the first fixing bracket according to a first hinge axis (C1) which is parallel and eccentric to the rotation axis (R) of the pin (115), and wherein the second axial end (55) is hinged, according to a second hinge axis (C2), which is parallel and eccentric to the rotation axis of the pin (R), to an arm (165, 1650), which is rotationally integral with the pin (115) about the rotation axis (R).

13 Claims, 15 Drawing Sheets

(56) References Cited

U.S. PATENT DOCUMENTS

| | | | | |
|---|---|---|---|---|
| 6,877,830 | B2 * | 4/2005 | Salice | E05D 15/262<br>312/319.2 |
| 7,497,532 | B2 * | 3/2009 | Salice | E05F 15/622<br>312/328 |
| 7,547,055 | B2 * | 6/2009 | Stratten | E05F 1/1091<br>296/57.1 |
| 7,556,305 | B2 * | 7/2009 | Stratten | B62D 33/03<br>296/57.1 |
| 7,797,796 | B2 * | 9/2010 | Migli | E05F 1/1091<br>16/366 |
| 8,082,629 | B2 * | 12/2011 | Migli | E05D 15/46<br>16/366 |
| 10,087,669 | B1 * | 10/2018 | Gnadinger | E05F 1/1091 |
| 10,119,591 | B1 * | 11/2018 | Duvall | G08B 21/182 |
| 10,907,393 | B2 * | 2/2021 | Leng | E05F 1/1091 |
| 11,543,171 | B2 * | 1/2023 | Möller | E05F 1/1091 |
| 2001/0039762 | A1 * | 11/2001 | Giovannetti | E05F 1/1091<br>49/246 |
| 2008/0134464 | A1 * | 6/2008 | Salice | E05F 5/02<br>16/84 |
| 2008/0216289 | A1 * | 9/2008 | Salice | E05D 15/262<br>49/192 |
| 2009/0139141 | A1 * | 6/2009 | MacLeod | E05F 3/02<br>49/21 |
| 2020/0072532 | A1 * | 3/2020 | Möller | F25D 23/028 |

* cited by examiner

DOOR-CLOSING DEVICE FOR REFRIGERATION CABINETS

TECHNICAL FIELD

The present invention concerns a door-closing device for refrigeration cabinets, in particular of the type fitted with an elastic element adapted to facilitate the closing of the door itself.

PRIOR ART

Refrigeration cabinets are known comprising a refrigerated compartment, which has an opening to access the inside of the compartment itself, and one or more wings adapted to selectively occlude or disengage at least partially the opening. Generally, such wings each comprise at least one panel made of thermally insulating and optically transparent material, for example of glass or polymeric material, and a panel support frame hinged to a frame fixed to the refrigerating compartment.

In order to prevent a user of the refrigeration cabinet from forgetting the wing open, rendering the refrigeration of the products inside the refrigerated compartment useless, door-closing devices are known which are configured to automatically return the wing to the closed position when the user does not act thereon.

Generally, an elastic element that generates an elastic force along a straight direction, such as a gas spring, is used to create such an automatic closure. For example, such devices comprise a first fixing bracket which is fixed, generally by screws, to the frame of the refrigeration cabinet and to which a first axial end of the gas spring is hinged.

The known devices also comprise a second fixing bracket which is fixed, also by screws, to the wing, in particular to the frame thereof, and to which a second axial end, opposite to the first, of the gas spring is hinged. A problem with this solution is that the first bracket and the second bracket can rotate freely with respect to the hinge axes with the elastic element as long as they are both fixed, respectively, to the frame and to the wing. In addition, a gas spring comprises a cylinder that realises the first axial end and from which a rod exits which realises the second axial end exits and which can rotate freely with respect to the sliding axis of the rod with respect to the cylinder, consequently in the devices of the prior art the first bracket and the second bracket can rotate with respect to each other around a sliding axis of the rod with respect to the cylinder, forcing the installer to hold the brackets in place during installation. This slows down the installer who has to manually hold the different elements of the door-closing device in place, which otherwise would move during installation and hamper him in his operations.

Aim of the present invention is to make available a door-closing device that is simpler and faster to install than prior art documents, as part of a rational, effective and cost-limited solution.

Such aim is achieved by the features of the invention reported in the independent claim. The dependent claims outline preferred and/or particularly advantageous aspects of the invention.

DISCLOSURE OF THE INVENTION

The invention makes available in particular a door-closing device for refrigeration cabinets provided with a wing hinged to a refrigerated compartment, said device comprising:

a first fixing bracket adapted to be fixed to the compartment, a second fixing bracket adapted to be fixed to the wing, a pin rotatably associated with the first plate with respect to a rotation axis and to which the second bracket is rotationally integral, an elastic element, which develops longitudinally along a longitudinal axis, is provided with a first axial end and an opposite second axial end and exerts an elastic force along said longitudinal axis, wherein the first axial end is hinged to the first fixing bracket according to a first hinge axis which is parallel and eccentric to the rotation axis of the pin, and wherein the second axial end is hinged, according to a second hinge axis, which is parallel and eccentric to the rotation axis of the pin, to an arm, which is rotationally integral with the pin about the rotation axis.

Thanks to this solution, the door-closing device is faster to install inside a refrigeration cabinet than the devices of the prior art since the elastic element is not free to move at will. In particular, in the case in which the elastic element is a gas spring, the stability is given by the fact that the plates cannot rotate with respect to the hinges, the gas spring cannot rotate freely around the sliding axis, as instead happens in the devices of the prior art. In this way it is possible to reduce costs and installation times.

According to one aspect of the invention, the elastic element can be a gas spring provided with a cylinder that realises the second axial end and from which a rod exits which realises the first axial end.

In this way, a door-closing device is made available that is particularly robust and able to allow to gently close the door which avoids strong impacts with the rest of the refrigeration cabinet that would occur in the event that the elastic element was a spring, in particular a helical spring. However, it is not excluded that in a less preferred embodiment the elastic element can comprise (only) a helical spring provided with a longitudinal end hinged to the first bracket and an opposite longitudinal end hinged to the arm. Further, the helical spring could be guided by a telescopic rod provided with a first axial end hinged to the first plate and an opposite second axial end, which is movable along a sliding axis with respect to the first axial end and hinged to the arm. In this case the first longitudinal end of the helical spring is integral with the first longitudinal end of the telescopic rod and the second end of the helical spring is integral with the second axial end of the telescopic rod. It is not excluded that in another less preferred embodiment with respect to the gas spring, the elastic element may comprise a gas spring and a helical spring that always acts on the arm in series with the gas spring.

According to another aspect of the invention, the first axial end of the elastic element can be hinged to the first bracket by a first hinge pin and the first bracket can comprise a first fixing seat of the first pin and a second fixing seat of the first pin symmetrical to the first seat with respect to a centreline plane of the first bracket, said first and second seats being shaped to allow the removable fixing of the first pin. Furthermore, the first bracket may comprise a first guiding cylinder of the pin of the arm and a second guiding cylinder of the pin of the arm symmetrical to the first guiding cylinder with respect to the centreline plane, said first guiding cylinder and second guiding cylinder being shaped to realise a rotoidal coupling with the pin of the arm defining the rotation axis. In this case, the first pin is selectively fixable in the first fixing seat or in the second fixing seat and the pin of the arm is selectively insertable in the first guiding cylinder or in the second guiding cylinder.

In this way it is possible with a single first bracket, a single pin of the arm and a single first pin to realise door-closing devices able to rotate the wing both clockwise and counterclockwise (especially in the case of two vertical wings that close the same cabinet, including one left wing and one right wing), while allowing to standardize the production which no longer requires a specific device for clockwise rotation and a specific device for counterclockwise rotation.

According to a further aspect of the invention, the first fixing seat and the second fixing seat may each comprise a respective threaded hole into which a threaded portion of the first pin is screwable.

According to another aspect of the invention, the door-closing device may comprise a pin retaining element configured so as to maintain a portion of the pin inside the first guiding cylinder or the second guiding cylinder and which can be removably associated with the first bracket at the first guiding cylinder or the second guiding cylinder.

The invention may further provide that the first bracket is provided with a plurality of through slots of elongated transverse shape and aligned along a straight direction.

In this way a single first bracket can be adapted to a plurality of different refrigeration compartments, i.e. different frames.

The invention may further provide that, with the wing in the closed position, the arm is substantially perpendicular to said first bracket, while with said wing in the open position and arranged so as to realise an angle equal to or greater than 90° with the opening of the refrigerated compartment, the hinge axis between said arm and said second axial end of the elastic element falls on said first bracket.

Alternatively, with the wing in the open position and arranged so as to realise an angle equal to or greater than 90° with the opening of the refrigerated compartment, it can be provided that the hinge axis between said arm and said second axial end of the elastic element falls outside the profile of said first bracket and in the space comprised between said opening of the refrigerated compartment and said wing.

The door-closing device according to the invention can provide that the gas spring is arranged in an inclined manner with respect to a horizontal plane.

In particular, the first axial end of the gas spring is arranged at a height with respect to a flat surface of the first bracket that is lower than the height at which the second axial end is arranged.

Preferably the cylinder of the gas spring has an inner surface having a constant cross-section.

Preferably, the rod is integral with a piston adapted to slide inside the cylinder; the piston bears at least one hole and a gasket in contact with the inner surface of the cylinder so that the at least one fluid can flow only inside said at least one hole.

The invention further makes available a closing apparatus for a refrigeration cabinet provided with a refrigerated compartment, said apparatus comprising:

- a frame adapted to be fixed to the refrigerated compartment and adapted to define an access opening to the refrigerated compartment itself, and
- a wing hinged according to a rotation axis to the frame by means of a door-closing device as described above,
- wherein the first bracket is fixed to the frame, the second bracket is fixed to the wing, and the hinge axis is defined by the rotation axis of the pin of the arm.

Further, the invention makes available a refrigeration cabinet comprising a refrigerated compartment and a compartment-closing apparatus as described above, in which the frame is fixed to the compartment.

BRIEF DESCRIPTION OF THE DRAWINGS

Further features and advantages of the invention will be more apparent after reading the following description provided by way of a non-limiting example, with the aid of the figures illustrated in the accompanying tables.

BEST MODE OF THE INVENTION

Figure 1:
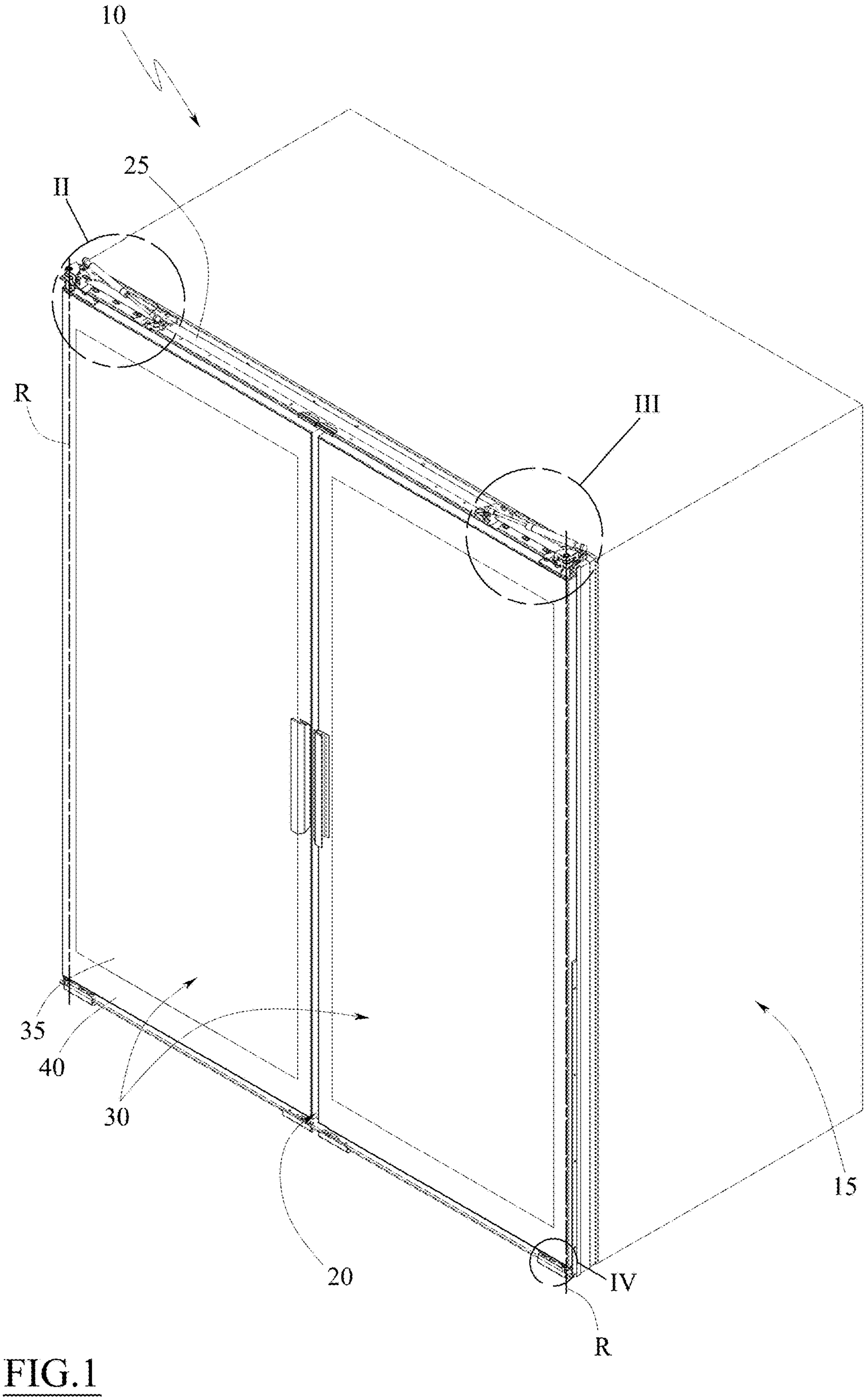
FIG. 1 is a front axonometric view of a refrigeration cabinet provided with a door-closing device in accordance with an embodiment of the invention.

With particular reference to FIGS. 1-11, a refrigeration cabinet comprising a refrigerated compartment 15, for example made available by a box-like body, inside which the products to be refrigerated are stored is indicated globally with 10.

The refrigeration cabinet, i.e. the box-like body, comprises an access opening 20 to the compartment, for example rectangular in shape, through which it is possible to access the compartment 15 from the outside.

The cabinet 10 also comprises a compartment-closing apparatus configured to occlude or disengage the access opening 20. In particular, this closing apparatus comprises a frame 25, for example rectangular in shape, fixed to the compartment 15, i.e. to the box-like body that makes it available, so as to frame the access opening 20. The frame 25 can be formed by a plurality of straight profiles which are joined together at the respective longitudinal ends, for example said profiles being made of polymeric or metallic material.

The closing apparatus further comprises a wing 30 adapted to selectively occlude or disengage, at least partially, the access opening 20 (i.e. a portion of access opening identified by the frame 25) for access to the compartment 15. In particular, the wing 30 is movable with respect to the compartment, i.e. to the box-like body, between a closed position, in which it at least partially occludes the access opening 20 preventing access (at least partially) to the compartment, and an open position, in which it does not obstruct access to the refrigerated compartment, i.e. it does not obstruct access to the compartment through a portion of access opening underlying the wing itself when the wing is in the closed position.

In particular, in the event that the refrigeration cabinet comprises a single wing, when it is in the closed position it fully occludes the access opening 20.

In the case, such as the one illustrated, in which the refrigeration cabinet comprises a plurality of wings 30, for example two wings 30, each wing, occludes a respective portion of access opening 20 or allows access thereto. Overall, access to the access opening 20 is completely prevented when all the wings 30 are in the closed position.

The wing 30, i.e. each wing 30, comprises a panel 35, for example rectangular in shape, made of thermally insulating material.

Preferably the panel 35 is also made of optically transparent material, for example such optically transparent and thermally insulating material may be glass or polymeric material or a combination of both.

The wing comprises a support frame 40 that supports and for example frames the panel 35.

The support frame 40 may be directly fixed, i.e. with no interposition of other structural elements, to the panel 35, for example by glues or other fixing elements. The support frame may comprise a plurality of straight edging profiles fixed to each other at the respective longitudinal ends, for example four (including an upper profile, a lower profile, a right profile and a left profile), which constitute a rectangular frame of the panel.

The wing is preferably provided with handle or a grasping surface adapted to be gripped by a user at least in order to bring the wing from the closed position to the open position.

At least one between the frame 25 and the wing 30, i.e. the support frame 40 of the wing, comprises a plurality of gaskets adapted to realise a hermetic seal such as to isolate the compartment 15 from the external environment when the wing 30 is in the closed position.

The wing 30, i.e. each wing 30, is hinged to the frame 25 according to a rotation axis R, for example parallel to a lying plane of the access opening 20, preferably vertical. In particular, the respective support frame 40 is hinged to the frame with respect to the rotation axis R. The wing is therefore movable between the open position and the closed position in rotation about the rotation axis R.

The wing, i.e. each wing 30, is hinged to the frame by means of a door-closing device 45 in accordance with an embodiment of the invention, i.e. a door-closing device 45 for each wing. This door-closing device 45 makes available the rotation axis R about which the wing 30 rotates and is also shaped so that the wing automatically moves towards the closed position when a user is not acting thereon. This automation takes place by means of an elastic element, as will be clearer below.

The elastic element of the door-closing device 45 develops longitudinally along a respective longitudinal axis, is provided with a first axial end 50 and an opposite second axial end 55 and exerts an elastic force (only) along said longitudinal axis, in particular only in the direction of away-movement between said axial ends.

For example, the elastic element may be a gas spring 60 like in the illustrated embodiment. In detail, the gas spring is provided with a cylinder 65 that realises the second axial end 55 and from which a rod 70 exits which realises the first axial end 50 (one end of the rod distal from the cylinder realises the second axial end) and that slides with respect to the cylinder along a sliding axis. In an equivalent embodiment the cylinder might be the one that makes the first axial end available and the rod the one that makes the second axial end available.

Inside the cylinder a piston (not illustrated) sliding along said sliding axis is slidably accommodated and the rod 70 is integral with said piston. The piston is provided with sealing gaskets that realise a fluidic seal with the cylinder and divides an internal volume of the cylinder into a first chamber and a second chamber, in which the rod that exits from the cylinder is partially contained. The gas spring is preloaded with a pressurised gas, for example with a pressure greater than 50 bar, preferably comprised between 70 bar and 90 bar, for application in the door-closing device 45. This preload is in particular carried out in such a way that the first chamber is filled with pressurised gas; consequently, in an undisturbed condition, the rod is at its maximum extension outside the cylinder, since the second chamber, the one in which the rod is partially accommodated, is reduced to the minimum of its volume because of the pressurised gas in the first chamber. By pushing the rod towards the inside of the cylinder with sufficient force, the pressurised gas in the first chamber is compressed, once this force is removed, the pressure of the gas in the first chamber returns the rod to the undisturbed position.

The door-closing device 45 comprises a first fixing bracket 75 fixed (directly) to the frame 25, for example by means of threaded connection members. In particular, the first fixing bracket 75 (hereinafter abbreviated as the first bracket 75) is provided with at least one through slot 80, for fixing the first bracket itself to the refrigerated compartment, in which one or more threaded connection members for the fixing to the frame can therefore be inserted. In the event that the threaded connection members are bolts, the frame must also comprise at least one through slot in which to insert the screw of the bolt.

The first bracket 75 is for example elongated in shape along a longitudinal axis transverse (perpendicular) to the rotation axis R.

Said longitudinal axis is also parallel to a vertical lying plane of the opening of the refrigerated compartment, or in other words it is parallel to a vertical lying plane of the panel of the wing when the wing is in the closed position.

The first bracket 75 comprises at least one portion shaped like a flat plate-shaped body (preferably it is all shaped like a flat plate-shaped body), for example substantially rectangular, perpendicular to the rotation axis R. The first bracket 75 therefore comprises a first major face 85, for example substantially flat, an opposite second major face 90, for example substantially flat, and a perimeter edge 95 that joins said two major faces. The distance between the first major face and the second major face substantially defines the thickness of the flat plate of the first bracket 75.

The rotation axis R is substantially transverse (perpendicular) to the flat plate, for example it is substantially transverse (perpendicular) to the first major face and to the second major face).

The first major face is at least partially in direct contact with the frame 25, i.e. it is in direct contact with a flat surface of the frame, for example a flat surface facing upwards of a top portion of the frame. In practice, the first bracket is at least partially superimposed in plan to a top portion of the frame.

Since the first bracket is substantially rectangular, the perimeter edge has, for example, two opposite long sides parallel to each other and connected to the respective longitudinal ends by two respective opposite short sides parallel to each other, and transverse (perpendicular) to the long sides).

In the illustrated embodiment the first bracket is plate-shaped, flat, and develops mainly along a longitudinal axis (parallel to the long sides of the perimeter edge). Furthermore, in the illustrated embodiment the first bracket comprises a lightening hole made in a central portion of the plate and which extends through the bracket itself, for example from the first major face to the second major face crossing both of them.

The plurality of through slots 80 are for example aligned with each other along a straight direction, for example parallel to the longitudinal axis of the first bracket. In particular, there are multiple groups of through slots, each group comprising through slots aligned with each other along a respective direction parallel to the other directions, for example such directions are parallel to the longitudinal axis of the first bracket.

In the illustrated embodiment there are three such groups of slots, one of which is substantially central and the other two to the right and to the left of the central one.

The plurality of through slots allows the first bracket to be fixed to a multitude of different frames, making it substantially universal.

The first bracket is hinged to the first axial end of the elastic element, i.e. the first axial end 50 of the gas spring 60, according to a first hinge axis C1 parallel to the rotation axis R.

In particular, the door-closing device 45 comprises a first hinge pin 100 fixed to the first bracket 75, in particular without residual degrees of freedom, which defines at least the hinge axis C1 parallel to the rotation axis R. In the illustrated embodiment, the first hinge pin comprises a spherical head in order to realise a spherical joint with a suitable spherical seat rigidly fixed to the first axial end of the elastic element.

The first hinge pin 100 is removably fixed to the first bracket 75, for example it is removably fixed in a provided fixing seat made available by the first bracket itself. Such a removable connection may be for example by means of a threaded connection, preferably a threaded hole into which the first hinge pin is screwed by means of a threaded portion of the first hinge pin itself. It is not excluded that in an alternative embodiment not illustrated, the fixing seat may comprise a through hole in place of the threaded hole, in which case the first hinge pin again comprises a threaded end that protrudes from a stem inserted into the through hole and on which a nut is screwed so as to clamp the first bracket between the nut and a head of the first hinge pin.

As a further detail, the first bracket 75 comprises a first fixing seat 105 of the first hinge pin 100 (adapted to allow a removable fixing of the first hinge pin) and a second fixing seat 110 of the first hinge pin 100 (adapted to allow a removable fixing of the first hinge pin) symmetrical to the first fixing seat 105 with respect to a centreline plane M of the first bracket, which centreline plane is parallel and eccentric to the rotation axis R (and to the first hinge axis C1).

The first fixing seat and the second fixing seat 110 are substantially identical. The first hinge pin may be selectively fixed (only) to the first or second seat, for example removably as mentioned above.

This centreline plane M (also possibly plane of symmetry in the case of the illustrated embodiment of the first flange) is perpendicular to a lying plane of the wing, i.e. of the panel thereof, when it is in the closed position.

In addition, the centreline plane is transverse (perpendicular) to the first bracket and to the longitudinal axis thereof. When the first bracket is shaped like a flat plate, in particular the centreline plane M is transverse (perpendicular) to the first major face and to the second major face and is equally-spaced from the short sides, as well as secant of the long sides.

Figure 7:
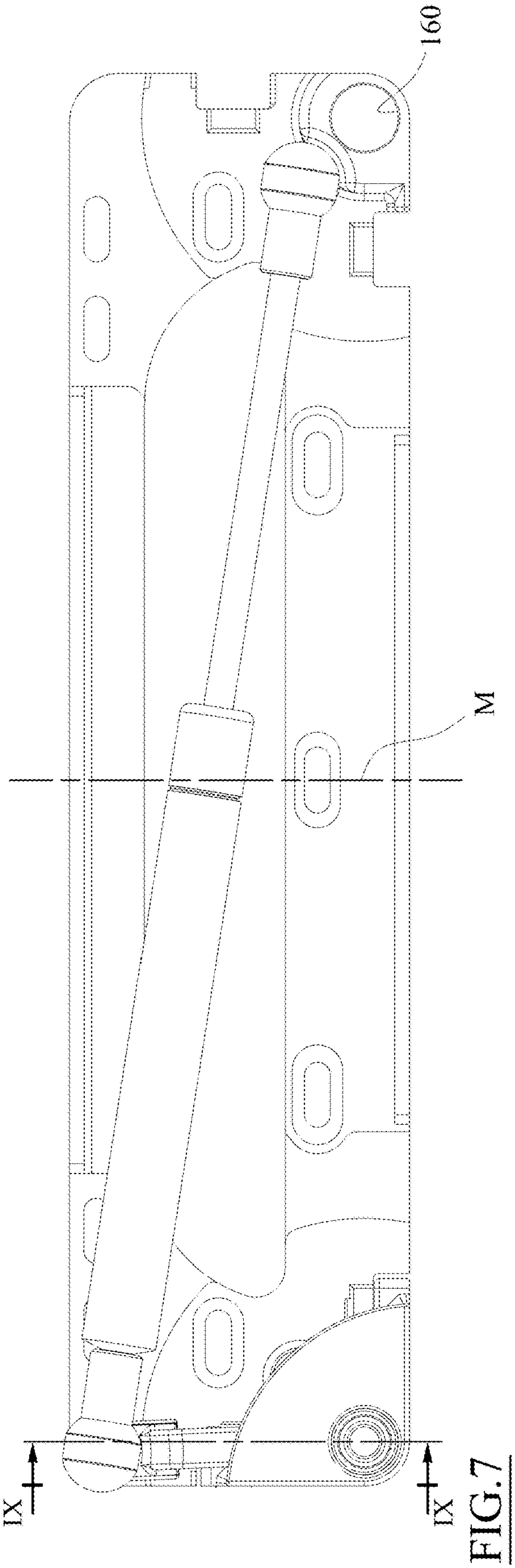
FIG. 7 is a top plan view of the door-closing device of FIG. 5, from which the second bracket has been removed for reasons of clarity.
Figure 8:
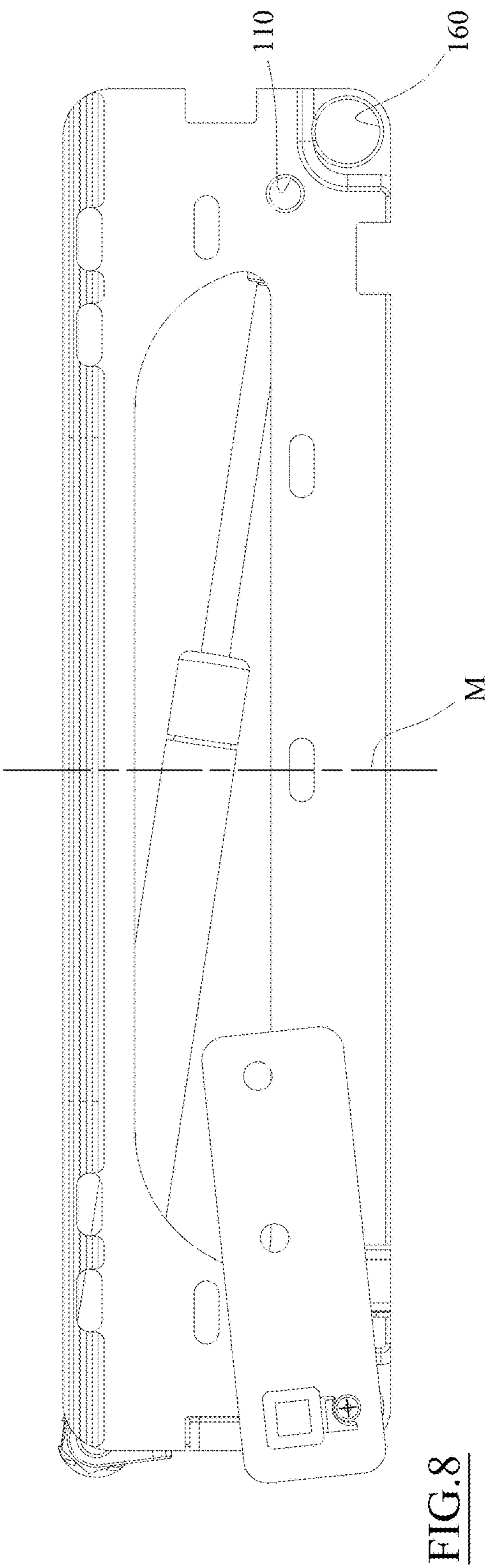
FIG. 8 is a bottom plan view of the door-closing device of FIG. 5.
Figure 9:
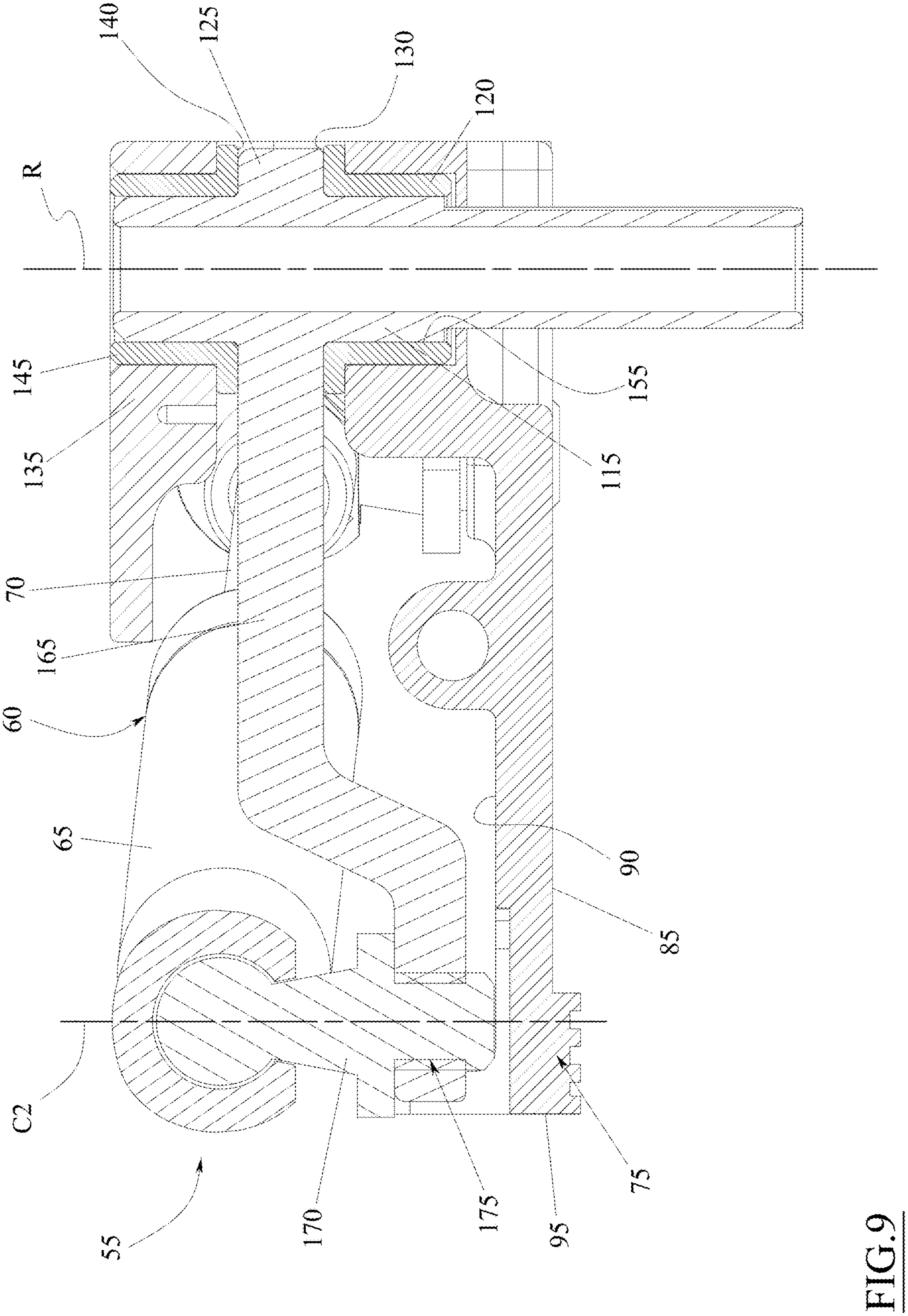
FIG. 9 is a sectional view of the door-closing device of FIG. 7 according to section axis IX-IX.
Figure 10:
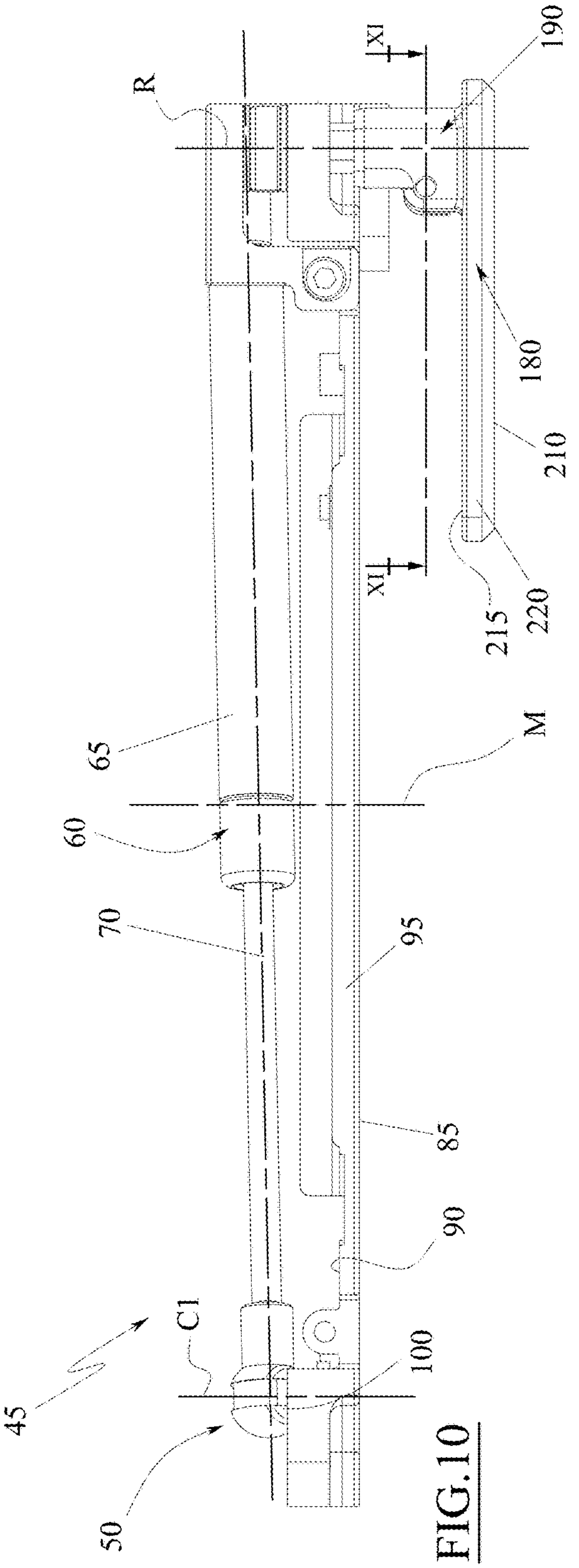
FIG. 10 is a rear view of the door-closing device of FIG. 5.
Figure 11:
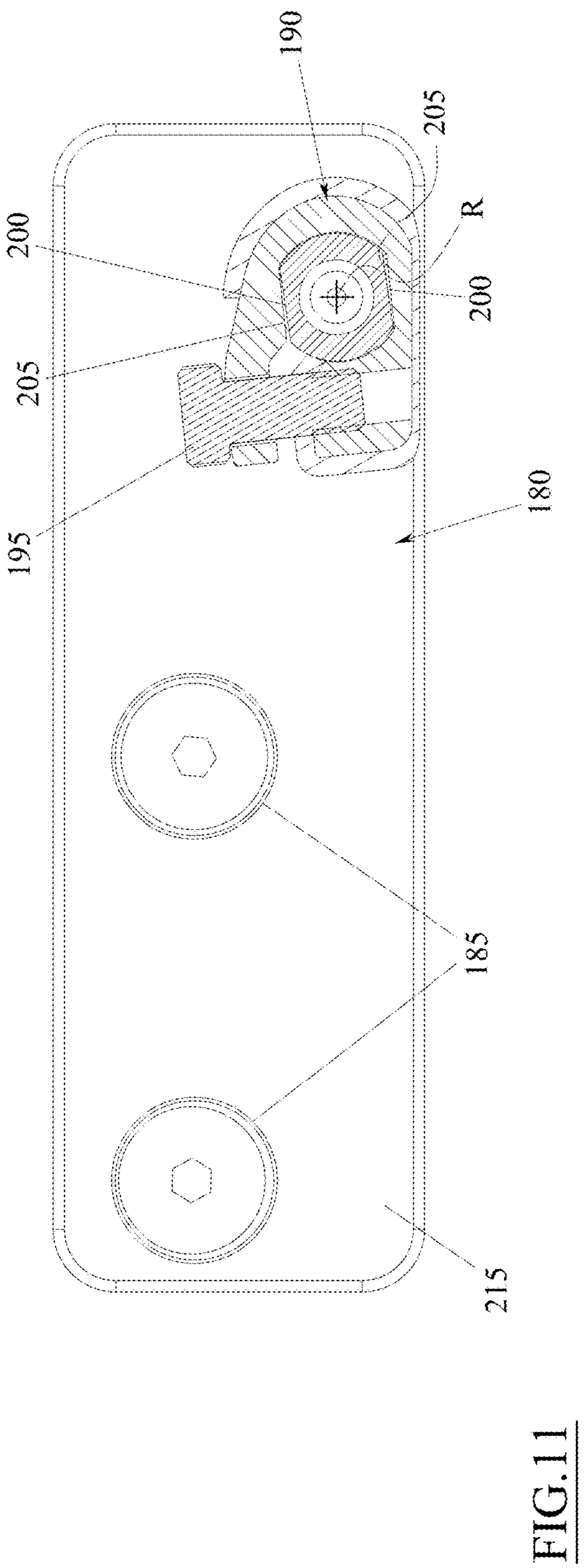
FIG. 11 is a sectional view of the door-closing device of FIG. 10 according to section axis XI-XI.

With reference to FIGS. 7 and 8, by way of example only, the first fixing seat 105 is located on the left in the first bracket (i.e. to the left of the centreline plane M) and the second fixing seat 110 is located on the right in the first bracket (i.e. to the right of the centreline plane).

In the illustrated embodiment, both the first fixing seat 105 and the second fixing seat 110 each comprise, i.e. consist of, a threaded hole made in the first flange itself. For example, such threaded holes define screwing axes parallel to the rotation axis R. It is not excluded, as mentioned above, that in place of the threaded holes there may be through holes. It is further not excluded that the seats may use other fixing systems than those described above, such as special quick-release systems. Furthermore, it is not excluded that in less preferred embodiments the first hinge pin can be welded in the first or second seat, in which case the seats only comprise reliefs or lowerings adapted to allow the correct centring of the pin before welding.

The door-closing device 45 comprises a pin 115 rotatably associated with the first bracket 75 with respect to the rotation axis R. In particular, it is such a pin 115, i.e. a guiding cylinder made in the first bracket and in which said pin is inserted, forming a rotoidal coupling, which defines the rotation axis R around which the wing rotates with respect to the refrigerated compartment.

The pin 115 may be inserted into the guiding cylinder by interposing a bushing 120 adapted to reduce friction.

The pin preferably has a longitudinal extension such as to extend both above and below with respect to the first bracket 75 in the portion in which the guiding cylinder is made, preferably the pin extends above the first bracket at least in the portion in which the guiding cylinder is made and extends below at least a vertical height that is lower than the minimum vertical height of the first bracket.

The guiding cylinder of the pin 115 is made in a portion of the first bracket, which is eccentric with respect to the fixing seat of the first hinge pin, i.e. eccentric with respect to the first and second fixing seat of the first hinge pin. For example, the guiding cylinder of the pin 115 is made on an opposite side of the centreline plane M with respect to the fixing seat of the first hinge pin.

The door-closing device 45, in order to prevent any movement of the pin sliding along the rotation axis R, comprises an assembly for retaining the pin itself, for example of a removable type to facilitate installation and maintenance.

In the illustrated embodiment, this retaining assembly comprises an enlarged portion 125 (in the radial direction with respect to the rotation axis R) of the pin 115 and a rest surface 130 of the first bracket, on which the enlarged portion 125 rests, for example above. The rest surface 130 is located at the guiding cylinder, for example the rest surface is a surface of the first face at the guiding cylinder or, like in the illustrated embodiment, is a surface of the bushing 120 placed between the guiding cylinder and the pin.

The enlarged portion is substantially shaped as a cylindrical disk coaxial to the rotation axis R and the surface on which the enlarged portion rests is an annular surface which is perpendicular to the rotation axis R. The retaining assembly also comprises a cage 135 provided with an abutment surface 140, for example annular and perpendicular to the rotation axis R, turned towards the first bracket, i.e. towards the first major face of the first bracket, and which limits the displacement of the pin in the direction of movement away from the first bracket realising an obstacle connection. In particular, the enlarged portion 125 of the pin is interposed, possibly clamped or in any case with reduced or no play, between the rest surface 130 and the abutment surface 140.

The abutment surface 140 may be made available by a face turned towards the first bracket of an annular body defining a cylindrical hole 140 in which a portion of the pin 115 is rotatably inserted. In the case of the illustrated embodiment, in which there is a bushing 145 for reducing friction also between said annular body and the pin 115, said abutment surface can be made available by a face of said bushing 145 turned towards the first bracket.

The cage 135 is preferably removably fixed to the first plate, for example by means of threaded connection members. For example, the cage comprises at least one pair of legs 150 which from the annular body develop in the direction towards the first plate and which preferably each have at least one through hole for insertion of a screw to be screwed into a threaded hole made in the first bracket.

It is not excluded that in less preferred embodiments the retaining assembly can be formed for example by a pair of seegers fitted on the pin respectively in the portions of the pin that protrudes above and below the first bracket at the guiding cylinder.

In order to allow the door-closing device 45 to adapt to both right and left wings, as they may be the first fixing seat and the second fixing seat 110, the first bracket 75 comprises a first guiding cylinder 155 for inserting the pin 115 to realise a rotoidal torque with the pin 115 and a second guiding cylinder 160 for inserting the pin 115 to realise a rotoidal torque with the pin 115, where the first guiding cylinder 155 and the second guiding cylinder are symmetrical with respect to each other with respect to the centreline plane M.

The guiding cylinder, between the first 155 and the second 160, in which the pin is inserted, defines the rotation axis R around which the wing rotates with respect to the refrigerated compartment.

The first guiding cylinder 155 and the second guiding cylinder 160 must therefore be identical. For example, they are both made as holes passing through the first flange, in particular passing through the first flange from the first major face to the second major face.

Both at the first guiding cylinder and at the second guiding cylinder, the first bracket provides means for fixing, for example removably, the cage 135, which can thus be fixed at the guiding cylinder between the first and second in which the pin 115 is inserted. For example, both at the first guiding cylinder and at the second guiding cylinder, the bracket has a plurality of threaded holes for screwing the screws necessary to keep the cage in place. The closing device comprises an arm 165 which develops starting from the pin 115, for example from the enlarged portion thereof, in the direction of movement away from the rotation axis R, for example perpendicularly thereto, and which is integral with the pin 115 rotatingly about the rotation axis R.

At one end of the arm 165 distal from the pin 115 there is hinged the second axial end 55 of the elastic element according to a second hinge axis C2 which is parallel and eccentric to both the first rotation axis R and to the first hinge axis C1 in the arm.

In the illustrated embodiment, the device comprises a second hinge pin 170 which is identical to the first hinge pin 100 and the end of the arm 165 distal to the pin 115 comprises a fixing seat 175 of the second hinge pin which is substantially identical to the first or second fixing seat 110.

The arm thus develops along its own longitudinal axis transverse (perpendicular) to the rotation axis R. For example, the longitudinal axis of the arm can be drawn as a straight line perpendicular to the rotation axis R and to the second hinge axis C2.

The cage of the pin 115 and the arm are shaped so that the arm can make a rotation of at least 90° or 95° about the rotation axis without these two elements obstructing one another, between the open position and the closed position of the wing. Once a predetermined threshold value is exceeded, the cage can achieve an end stroke for the arm in the direction for opening the wing.

In the illustrated embodiment, when the wing is in the closed position the longitudinal axis of the arm is substantially perpendicular to a lying plane of the opening of the refrigerated compartment.

Furthermore, again in the closed position the longitudinal axis of the arm is substantially perpendicular to the longitudinal axis of the first bracket. In the open position of the wing, the longitudinal axis of the arm may be parallel to the longitudinal axis of the first bracket.

The door-closing device 45 comprises a second fixing bracket 180 which is fixed, for example by means of threaded connection members, to the wing, i.e. to a respective wing, in particular to the support frame (a top portion facing upwards of the support frame) of said wing. In particular, the second fixing bracket 180 (hereinafter abbreviated as the second bracket 180) is provided with at least one through slot 185, preferably a plurality of through slots 185, for fixing the second bracket itself to the wing, in which one or more threaded connection members for the fixing to the wing, i.e. to the support frame thereof, can therefore be inserted. Said through slots being aligned along a longitudinal direction of the bracket itself.

The second bracket 180 is also rotationally integral with the pin 115 about the rotation axis R (without further degrees of residual freedom between the two), preferably the connection between the second bracket and the pin is removable, as will be explained in more detail below, however it is not excluded that in an alternative embodiment illustrated these two elements can be welded together.

When the second bracket is fixed to the wing, the arm 165, i.e. the longitudinal axis thereof, is transverse (substantially perpendicular) to a vertical lying plane of the wing itself, i.e. a vertical lying plane of the panel of the wing.

In addition, the second bracket is arranged with longitudinal axis perpendicular to the longitudinal axis of the arm.

The second bracket is preferably placed on one side of the first bracket that is opposite with respect to the arm 165 and to the elastic element. In particular, the second bracket is, for example, entirely located at a vertical height that is lower than the first bracket 75. In other words, the second bracket is fixed rotationally integral with the portion of pin 115 that protrudes from the guiding cylinder below the first bracket.

For fixing the pin to the second bracket, for example, the second bracket comprises a housing seat of the pin 115 adapted to accommodate a portion of the pin, which housing seat can for example comprise a clamp mechanism inside which a portion of the pin is clamped. In the illustrated embodiment, the housing seat comprises a tubular body 190 that accommodates the portion of the pin inside it to size and, for example, which is provided with a longitudinal split that extends along the entire length of the tubular body itself, from the inside to the outside of the tubular body, and that realises a first flap and a second flap of the tubular body. The clamp mechanism then comprises an apparatus for deforming the tubular body in order to bring the first flap closer to the second flap and tighten the pin portion contained within the tubular body. For example, the apparatus for deforming the tubular body comprises a screw 195 having a head with greater diameter than a through hole realised in the first flap, and a threaded stem inserted into a threaded hole realised in the second flap. By screwing said screw, the first flap is clamped between the screw head and the second flap, clamping the pin accordingly.

To make the transmission of the rotary motion between the second bracket and the pin more stable and to avoid slippage, the pin has two flat surfaces 200 which are parallel to each other and parallel to the rotation axis that form a prismatic connection with two other flat surfaces 205 of the housing seat of the pin 115, i.e. of an inner surface of the tubular body 190.

In order to facilitate the closing of the door even in the event that the elastic element should break, as known to the person skilled in the art, these flat surfaces 200 lie on lying planes which are inclined with respect to a lying plane of the opening 20, for example by an angle of about 4°-8°, as can be seen in FIG. 7.

The second bracket 180 is for example elongated in shape along a longitudinal axis transverse (perpendicular) to the rotation axis R. This longitudinal axis lies on a vertical plane transverse (perpendicular) to a vertical lying plane of the longitudinal axis of the arm 165. Regardless of this specific configuration, the wing, i.e. the panel, lies on a vertical plane transverse (perpendicular) to a vertical lying plane of the longitudinal axis of the arm 165.

The second bracket 180 comprises at least one portion shaped as a flat plate-shaped body, for example substantially rectangular, in which the through slot 185 is made and which is substantially perpendicular to the rotation axis R. This plate-shaped portion therefore comprises a first major face 210, for example substantially flat, an opposite second major face 215, for example substantially flat, and a perimeter edge 220 that joins said two major faces. The distance between the first major face and the second major face substantially defines the thickness of the flat plate of the second bracket 180. The rotation axis R is substantially transverse (perpendicular) to the flat plate, for example it is substantially transverse (perpendicular) to the first major face and to the second major face.

The first major face is at least partially in direct contact with the wing support frame. In practice, the second bracket is at least partially superimposed in plan to a top portion of the wing support frame.

Since the second bracket is substantially rectangular, the perimeter edge has, for example, two opposite long sides which are parallel to each other and connected to the respective longitudinal ends by two respective opposite short sides parallel to each other, and transverse (perpendicular) to the long sides.

The plurality of through slots 185 are for example aligned with each other along a straight direction, for example parallel to the longitudinal axis of the second bracket.

The housing seat of the pin rises from a (end) portion of the portion shaped as a flat plate, for example vertically upward.

The second bracket may further comprise a housing seat 225 of a hinge rod of the wing, which hinge rod develops in the support frame of the panel of the wing along the entire vertical extension thereof and protrudes below the wing so as to fit into a hinge device 230 (not further described as known to the person skilled in the art) made in the frame and defining a hinge axis coaxial to the rotation axis R.

The housing seat of the hinge rod is thus coaxial to the pin 115 and to the rotation axis R. For example, said housing seat and the hinge rod form a prismatic connection which is rotatingly integral about the rotation axis R.

The second bracket 180 is made in a body distinct from the first bracket 75, furthermore, regardless of the fact that in the illustrated embodiment the first bracket 75 is a monolithic body, at least the portion of bracket in which the first axial end is hinged and the one in which the pin of the arm is hinged are rigidly connected to each other without degrees of residual freedom, i.e. at least this portion is made as a monolithic body. In particular, at least the portion in which the fixing seat of the first hinge pin is made, is rigidly connected to the portion in which the guiding cylinder of the pin 115 is made without degrees of residual freedom, i.e. at least these portions make a single monolithic body. Even more in detail, the portions in which the first fixing seat 105 and the second fixing seat 110 are made are rigidly connected without degrees of residual freedom to the portions in which the first guiding cylinder 155 and the second guiding cylinder 160 are made, i.e. at least these portions make a single monolithic body.

The door-closing device 45 may comprise an alignment bracket 230, fixed to the first bracket and provided with a flat surface parallel to the rotation axis and to the longitudinal axis of the first bracket itself. This alignment bracket is placed at an edge of the first bracket and is adapted to abut against a flat vertical surface of the frame.

The operation of the invention is as follows.

First of all, the specific shape of the proposed invention allows the technician installing the door-closing device 45 to assemble the door-closing device 45 according to whether the wing should rotate, from the closed position to the open position, clockwise or counterclockwise, in other words if it has to be opened to the right or to the left.

Figure 3:
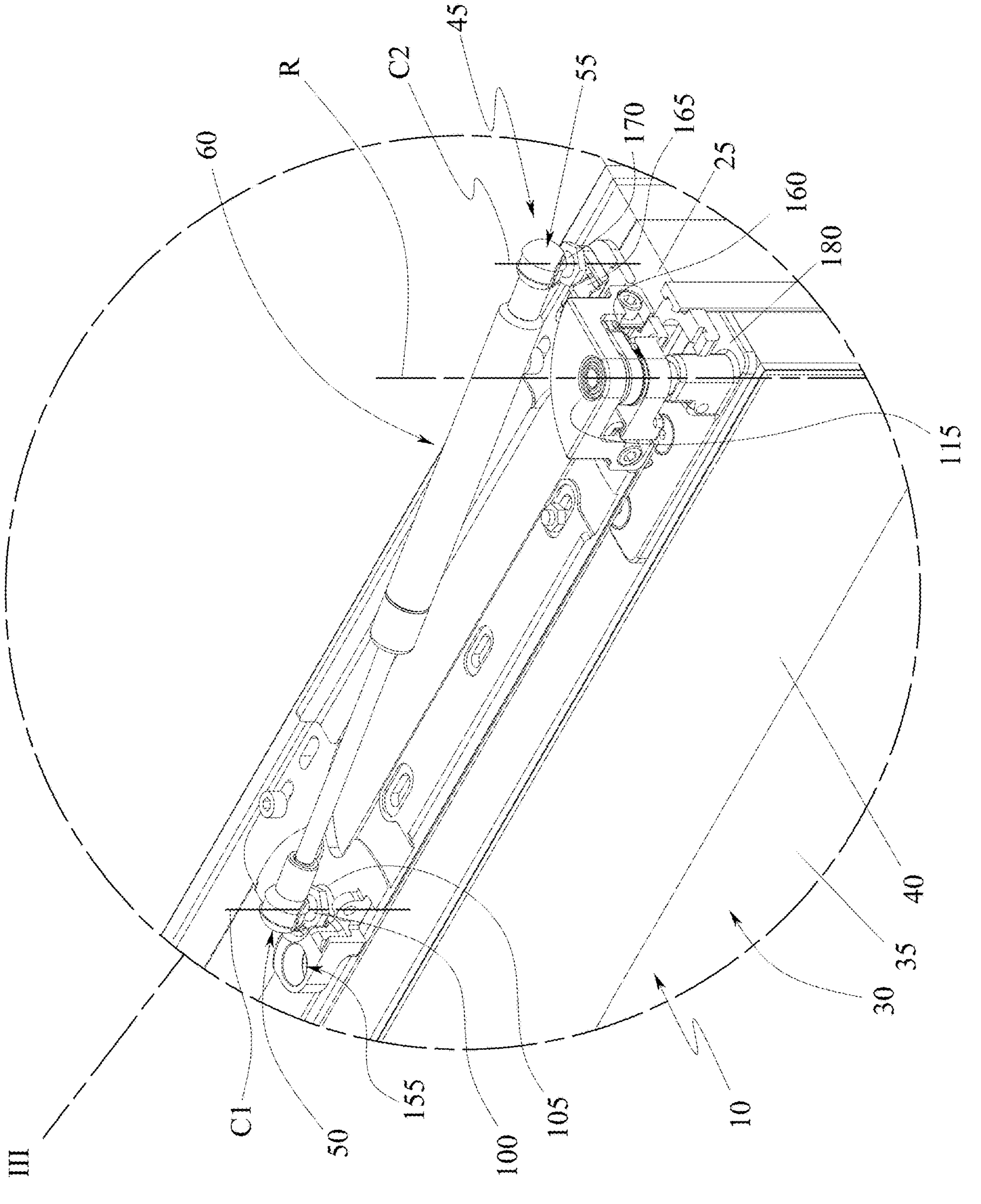
FIG. 3 is an enlargement of detail III of FIG. 1.
Figure 4:
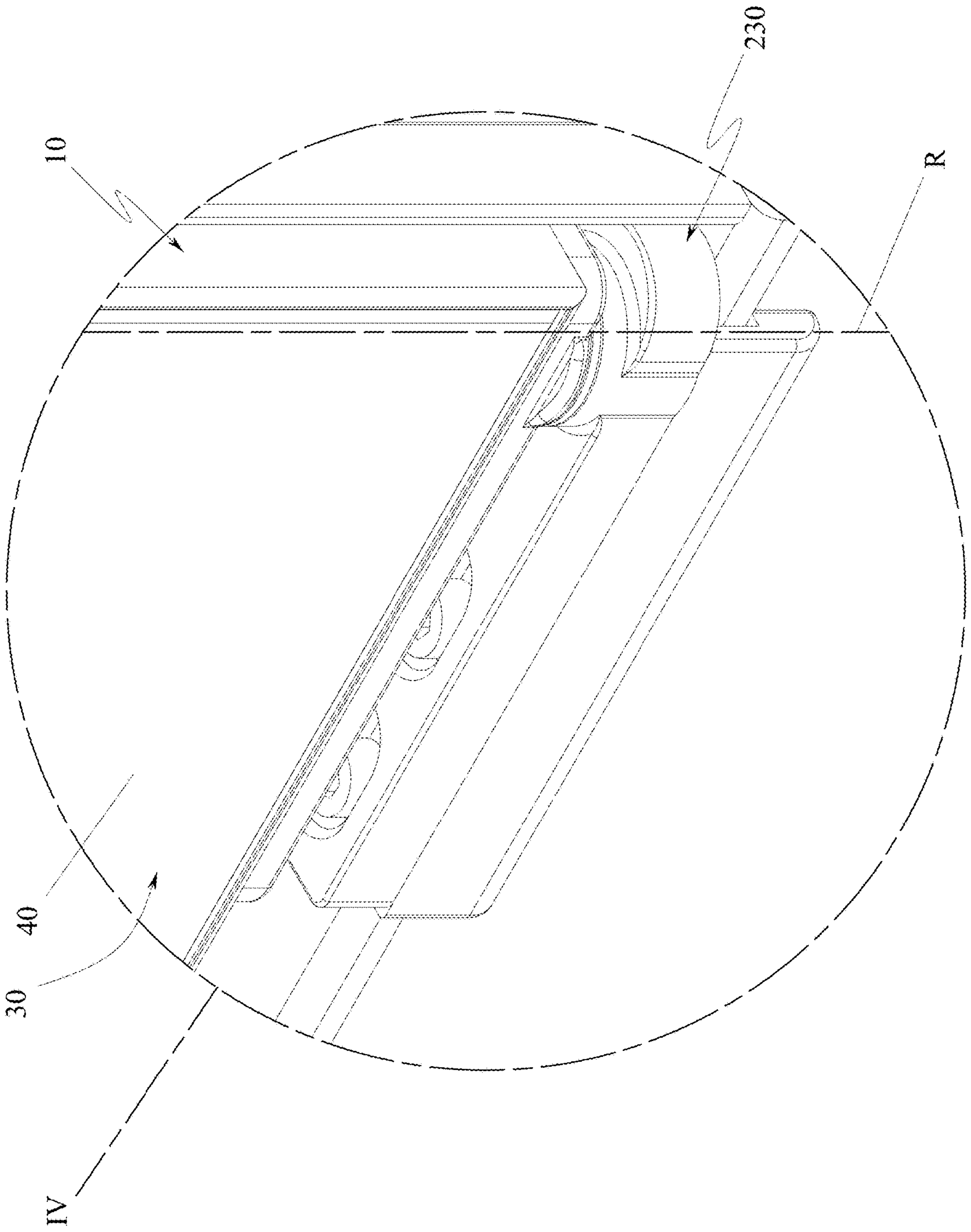
FIG. 4 is an enlargement of detail IV of FIG. 1.
Figure 5:
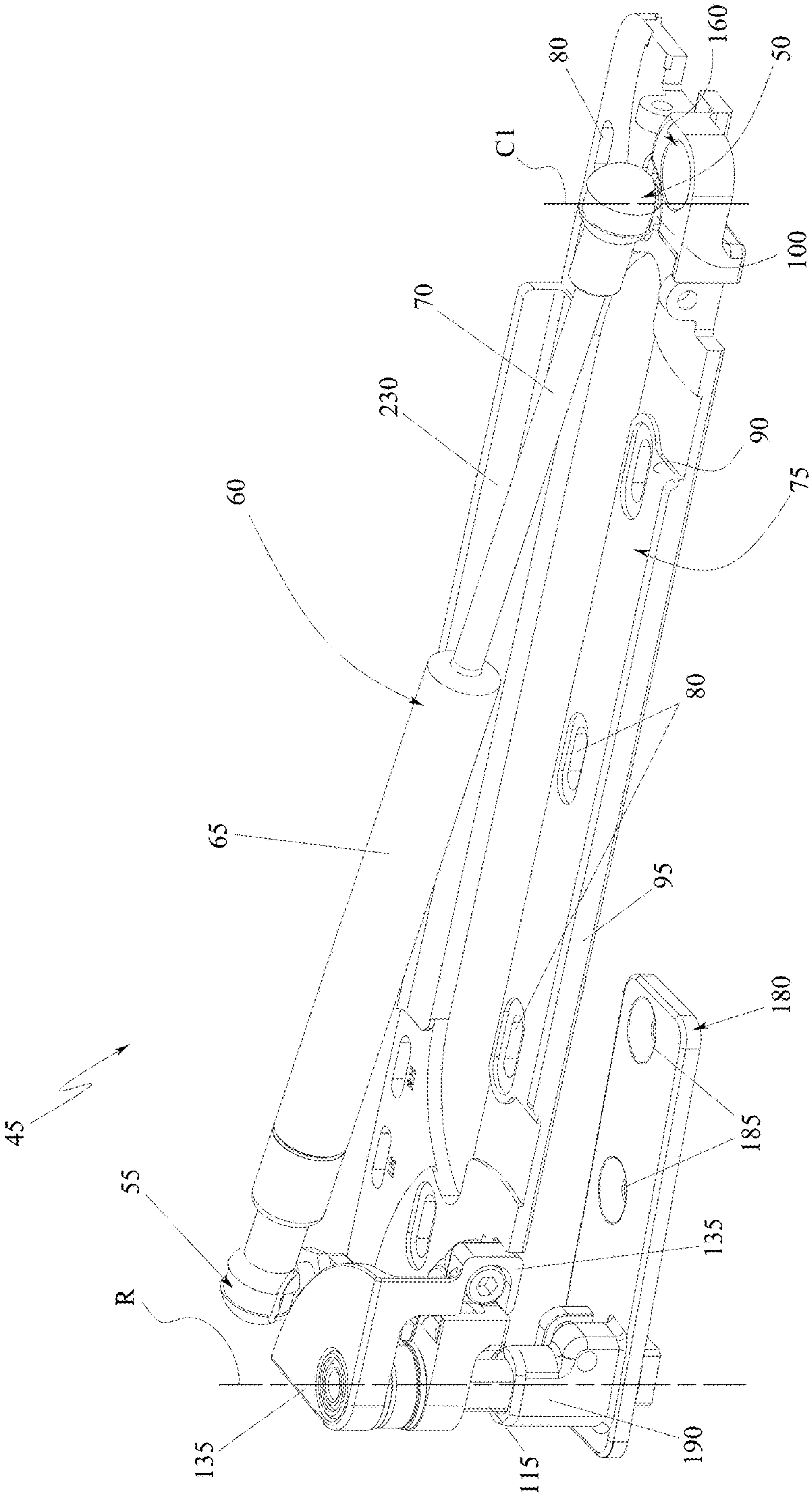
FIG. 5 is an axonometric view of the door-closing device according to the invention isolated from the refrigeration cabinet.
Figure 6:
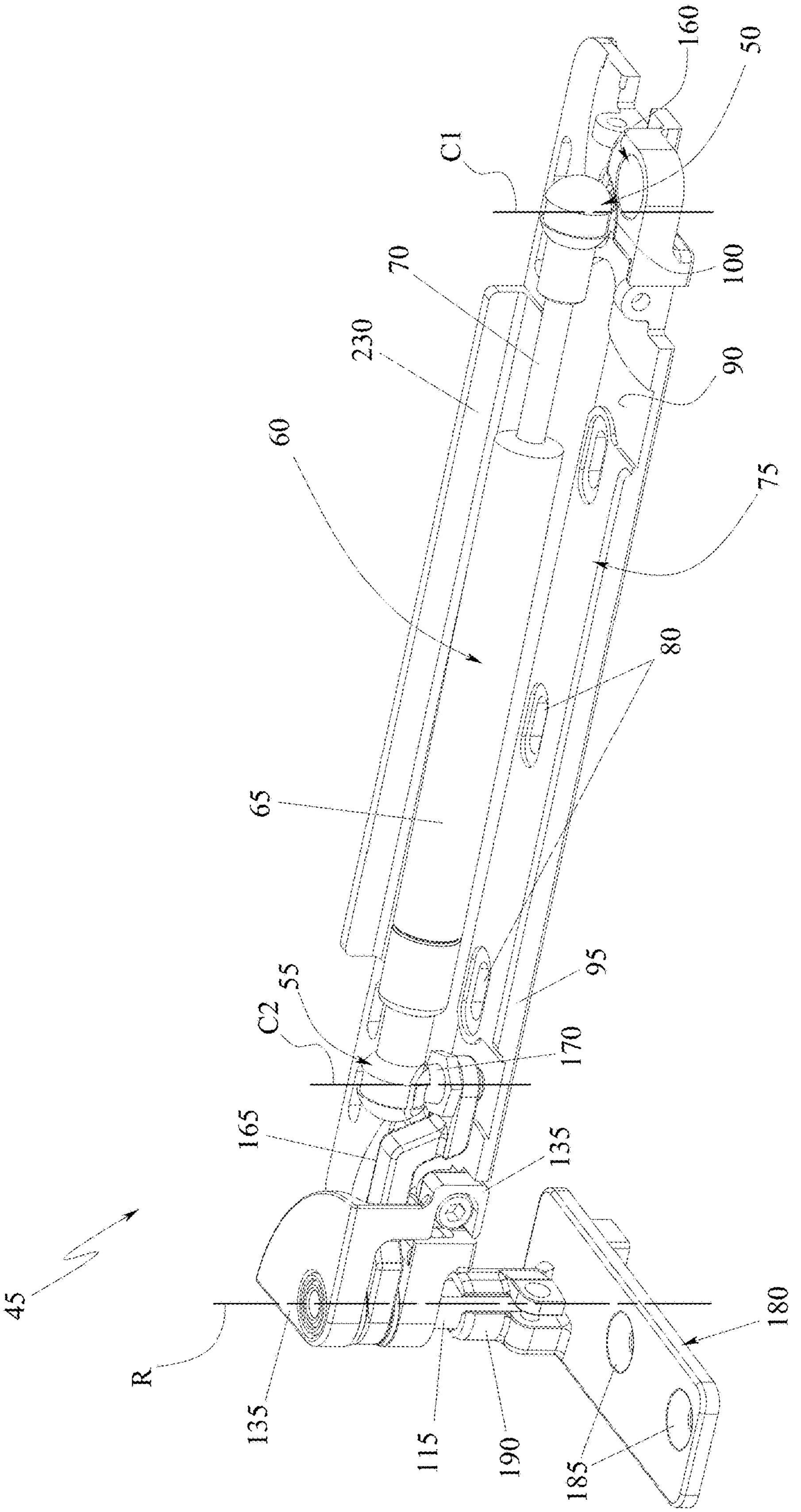
FIG. 6 is an axonometric view of the door-closing device of FIG. 5, illustrated in an open position of a wing of the refrigeration cabinet.

In particular, referring to a right and a left as in the illustrated Figures, if the wing has to be opened counterclockwise, like the wing of the enlargement of FIG. 3, the first hinge pin must be inserted into the first fixing seat 105 and the pin 115 must be inserted into the second guiding cylinder 160, where it is subsequently locked with the cage 135 which is fixed by means of the screws inserted into the threaded holes near the second guiding cylinder.

Figure 2:
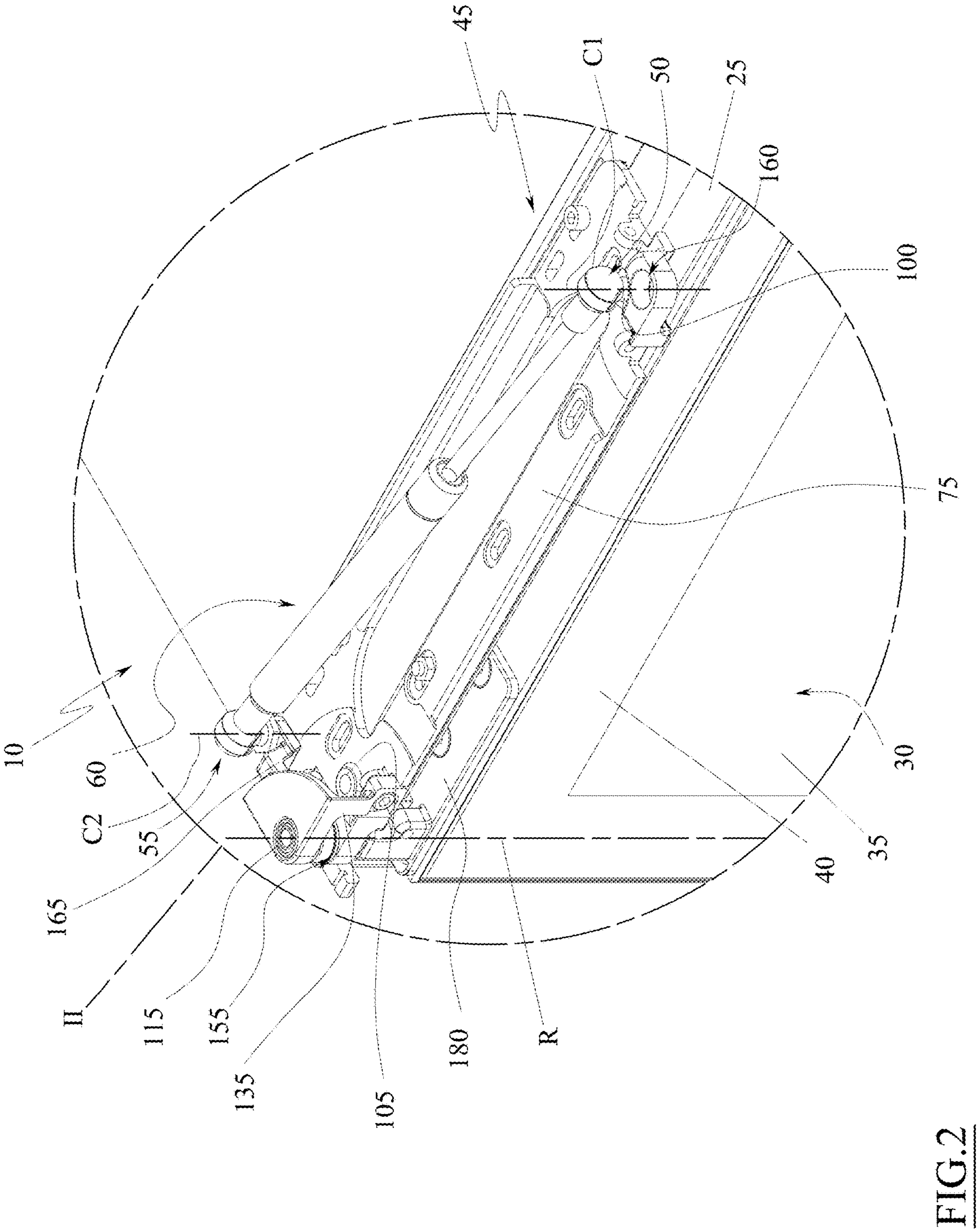
FIG. 2 is an enlargement of detail II of FIG. 1.

If, on the other hand, the wing has to be opened clockwise, like the wing of the enlargement of FIG. 2 and in FIGS. 7 and 8, the first hinge pin must be inserted into the second fixing seat 110 and the pin 115 must be inserted into the first guiding cylinder 155, where it is subsequently locked with the cage 135 which is fixed by means of the screws inserted into the threaded holes near the first guiding cylinder.

Subsequently, the second hinge pin may be fixed to the arm 165 and, if the elastic element was not already hinged to the hinge pins, connect the elastic element to the hinge pins.

Once these operations have been carried out, or in the event that the embodiment is not of the type that can be assembled on site for clockwise and counterclockwise rotations, the door-closing device can be fixed to the wing and to the frame, in particular the first flange is fixed, by means of its slots, to the frame and the second flange is fixed by means of its slots to the wing, i.e. to its support frame.

At this point the wing can rotate with respect to the frame about the rotation axis R.

When a user acts on the wing to bring it from the closed position to the open position, the second flange, being integral with the wing, transmits the rotary motion to the pin 115 and consequently to the arm, which compresses the elastic element in contrast to the force exerted by it, that is, in the direction of approach of the second axial end to the first axial end.

When the user releases the wing, the elastic element automatically pushes on the arm by rotating the pin 115 and consequently the second flange, which carries the wing along with it towards the closed position.

The closing device is preferably configured so that when the wing is in the closed position the elastic element must not be in the resting condition, but must exert a thrust on the arm.

With particular reference to FIGS. 12-21, a door-closing device 450 is shown in accordance with a variant of the embodiment of the present invention. The door-closing device 450 differs from the door-closing device 45 of the embodiment of the invention only in the different geometry of the arm 1650 with respect to the arm 165 and in the greater simplicity of the first bracket 750 with respect to the first bracket 75 of the embodiment of the invention; the same elements of the embodiment of the invention and of the variant thereof will be indicated with the same numerical references.

Figure 12:
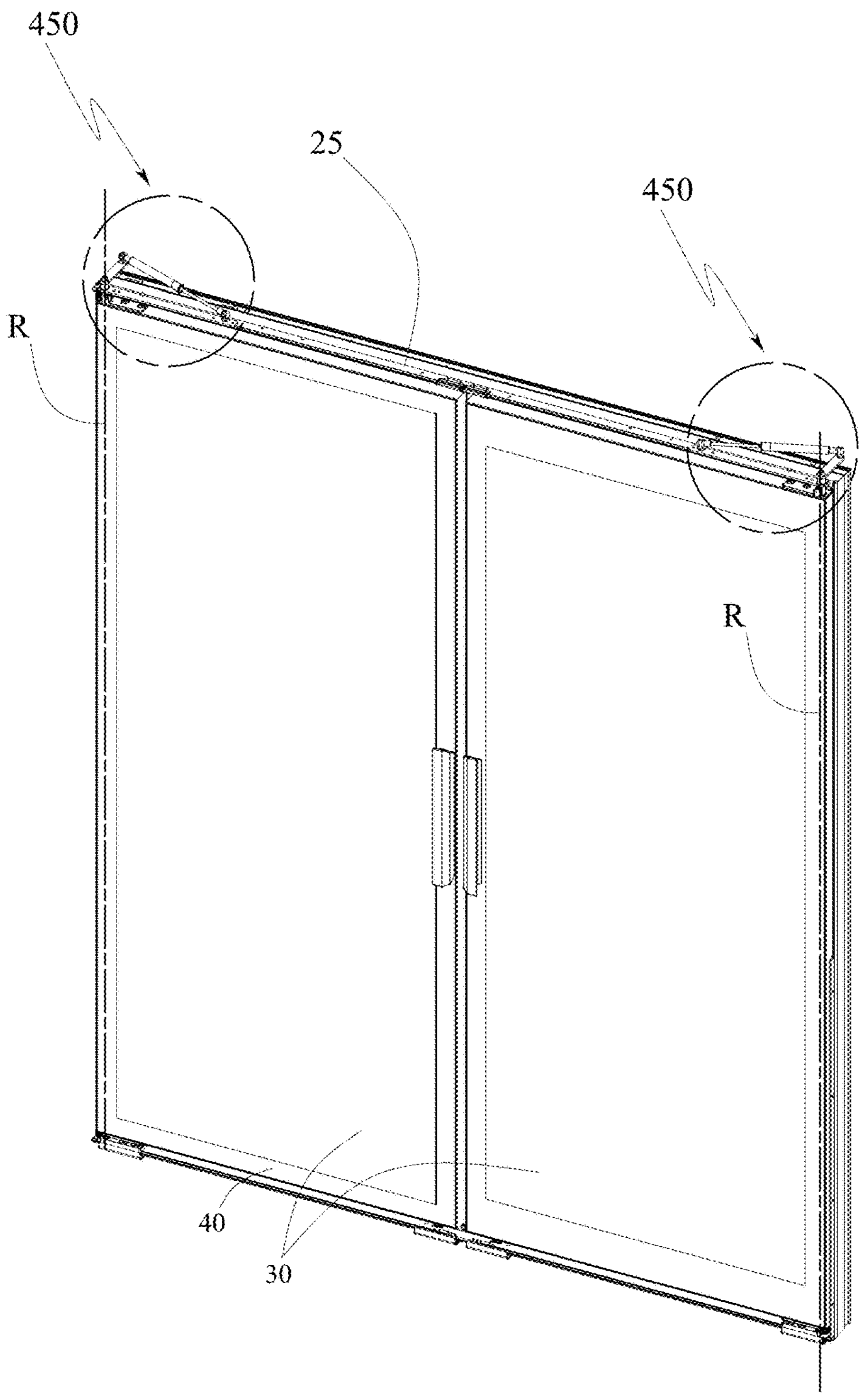
FIG. 12 is a front axonometric view of wings for refrigeration cabinet which are provided with door-closing devices in accordance with a variant of the embodiment of the present invention.
Figure 13:
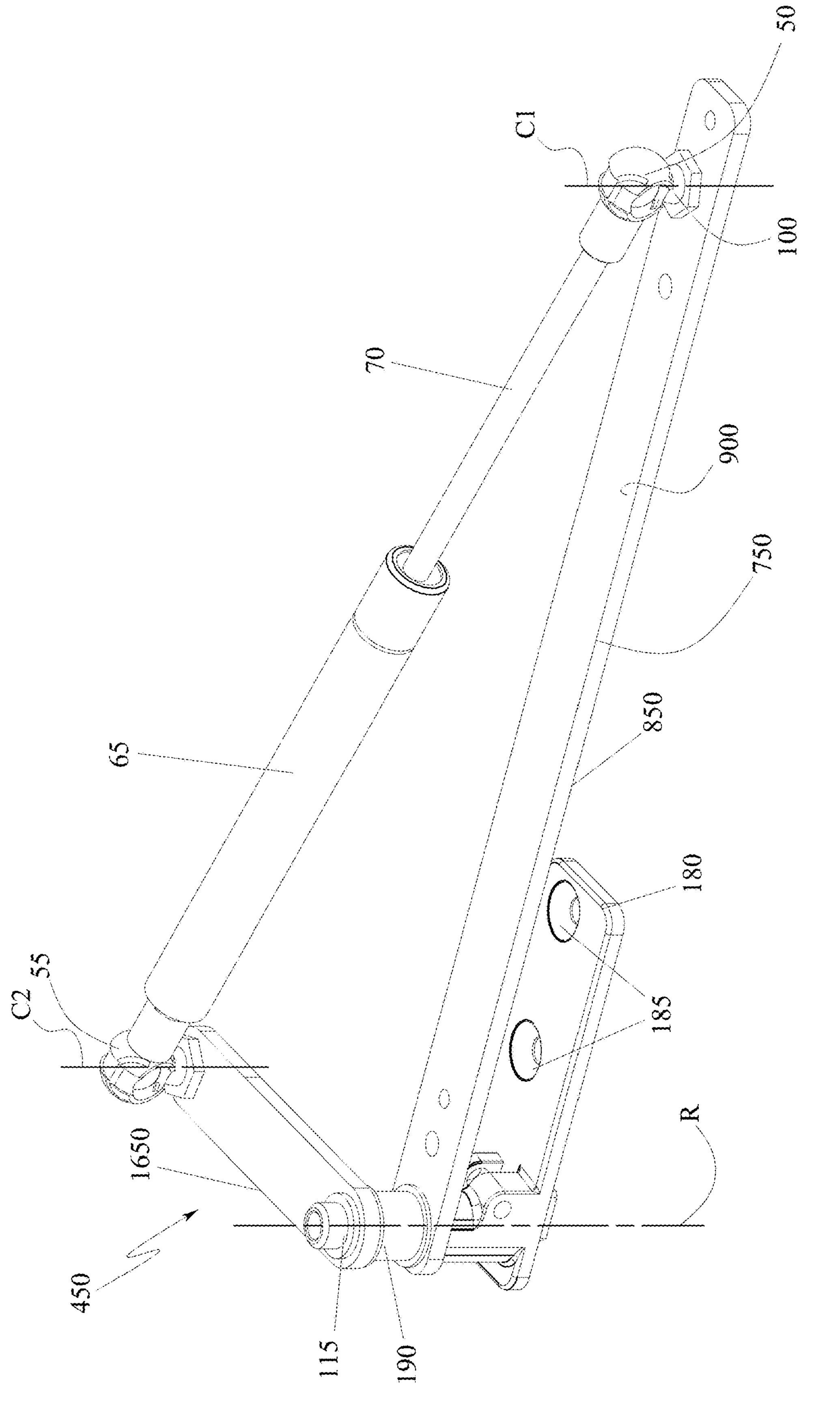
FIG. 13 is an axonometric view of one of the two door-closing devices of FIG. 12 with closed wing.
Figure 14:
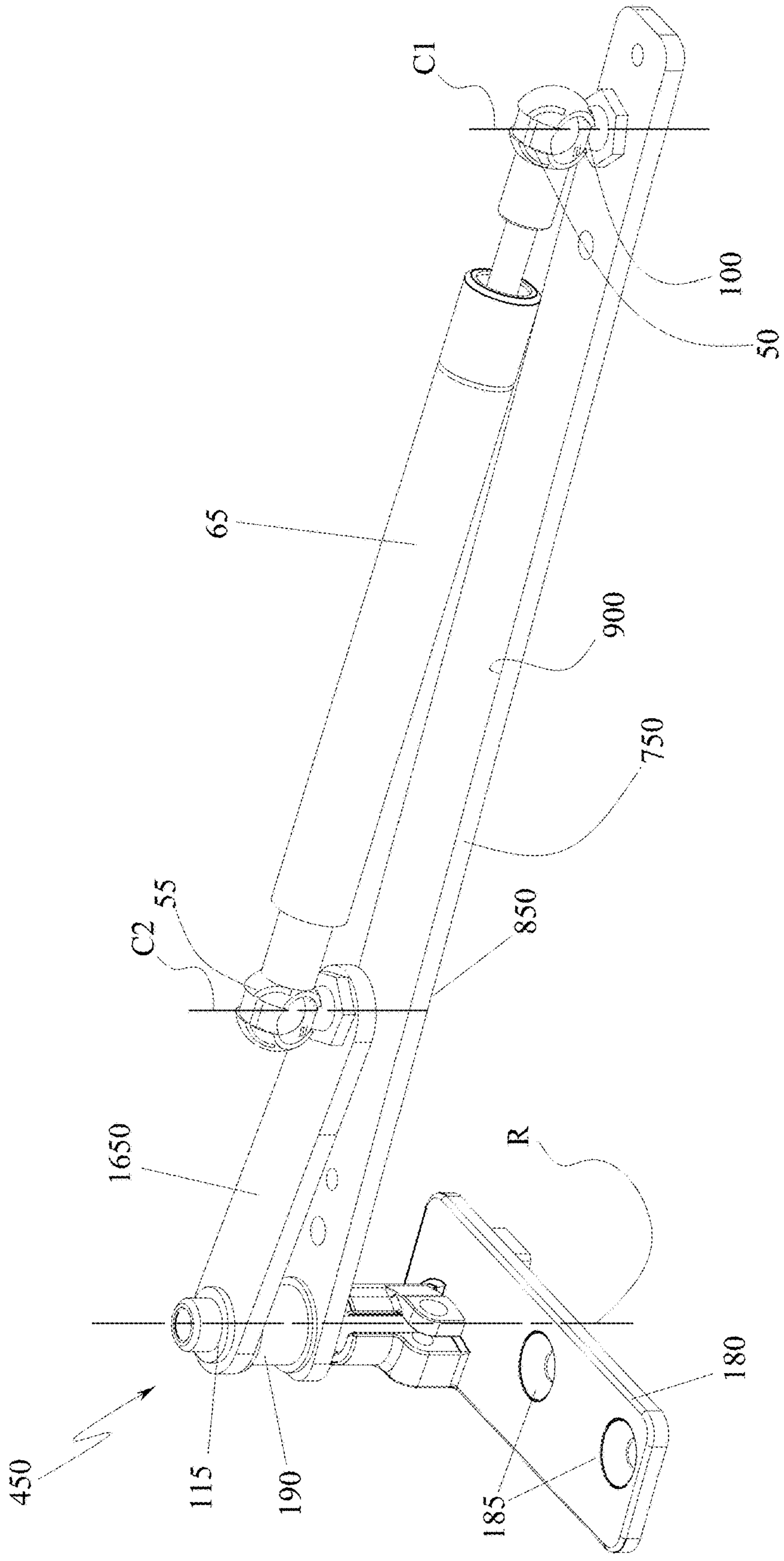
FIG. 14 is an axonometric view of the door-closing device of FIG. 13 with open wing.
Figure 17:
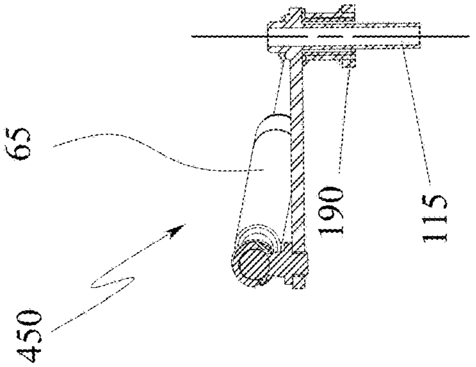
FIG. 17 is a sectional view of the door-closing device of FIG. 15 according to section axis XVII-XVII.
Figure 15:
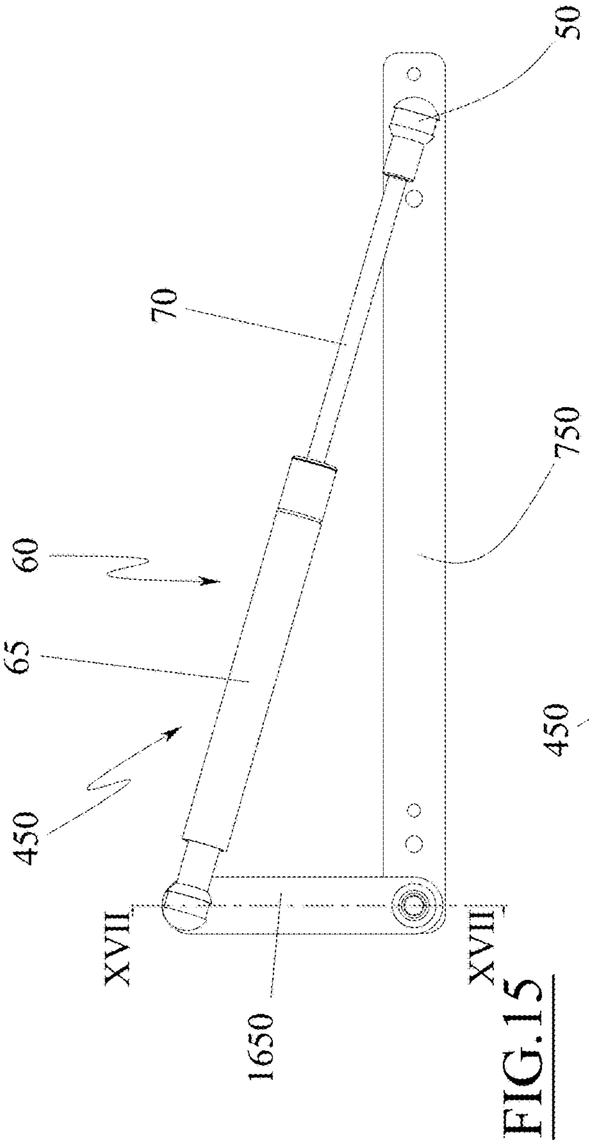
FIG. 15 is a top view of the door-closing device of FIG. 13.
Figure 16:
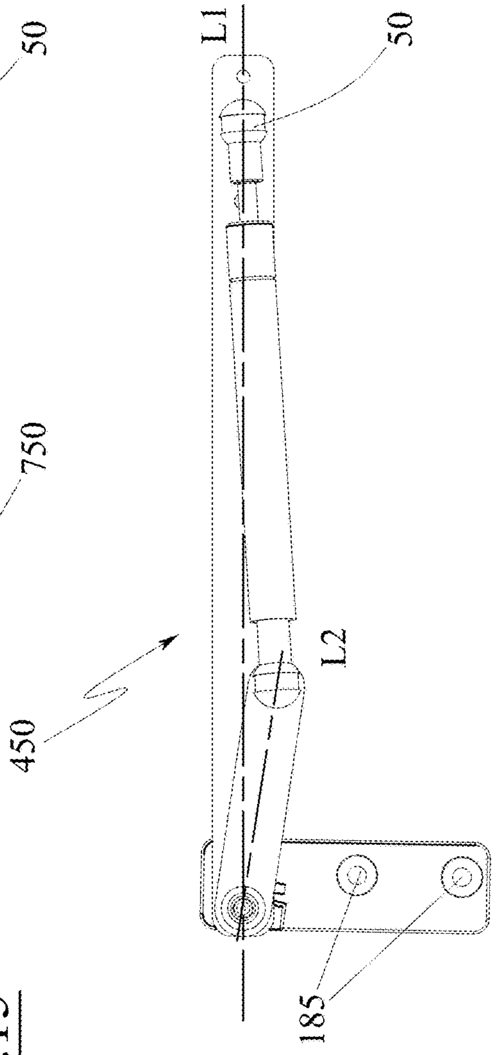
FIG. 16 is a top view of the door-closing device of FIG. 14.
Figure 18:
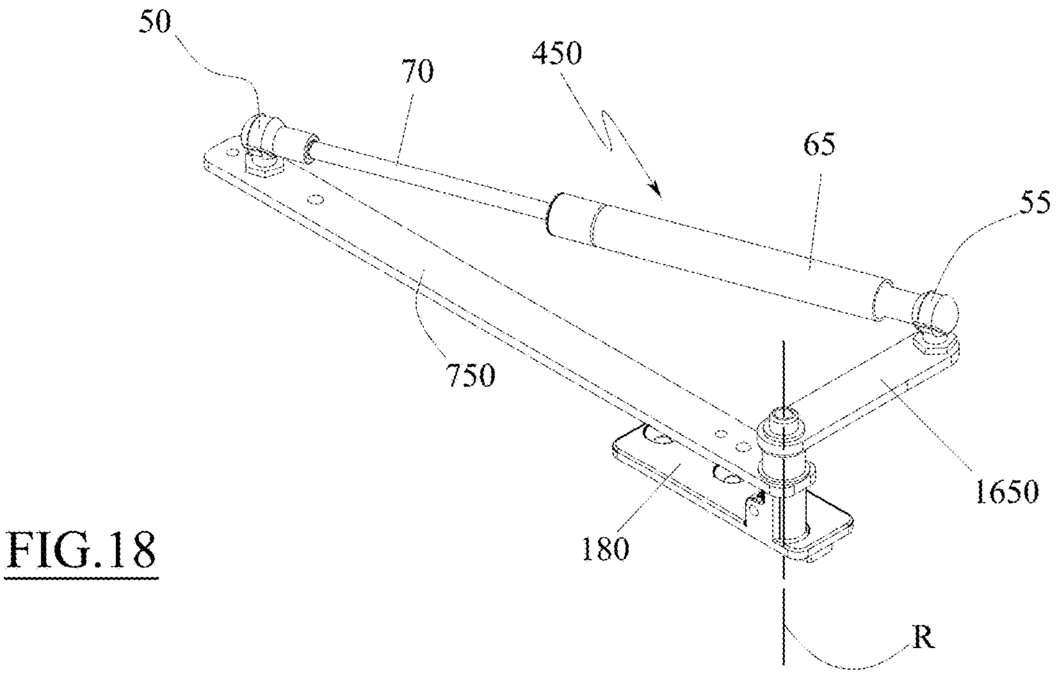
FIGS. 18-20 are perspective, front and top views of the other of the two door-closing devices of FIG. 12.
Figure 19:
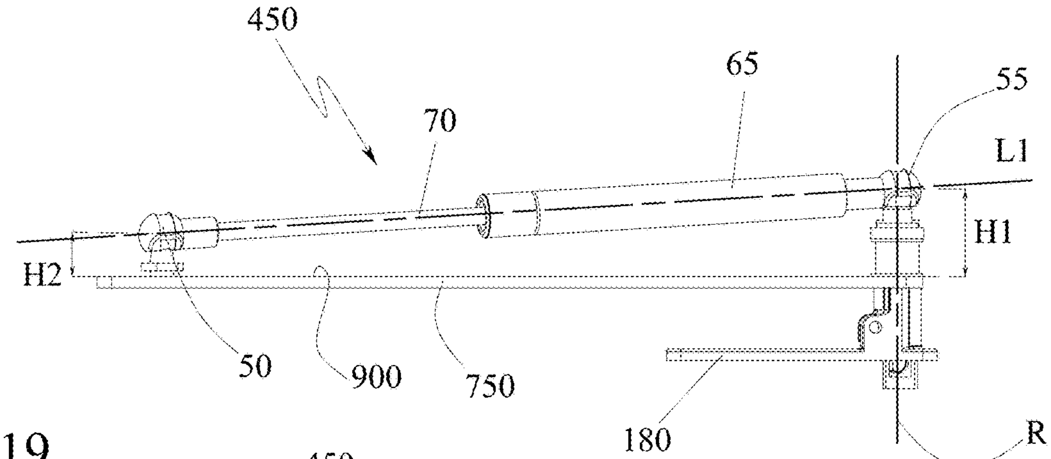
Figure 20:
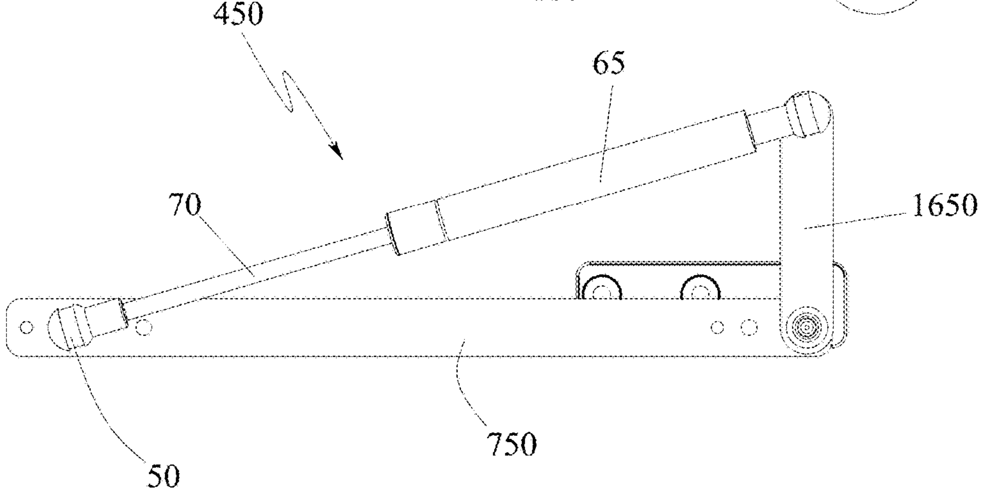
Figure 21:
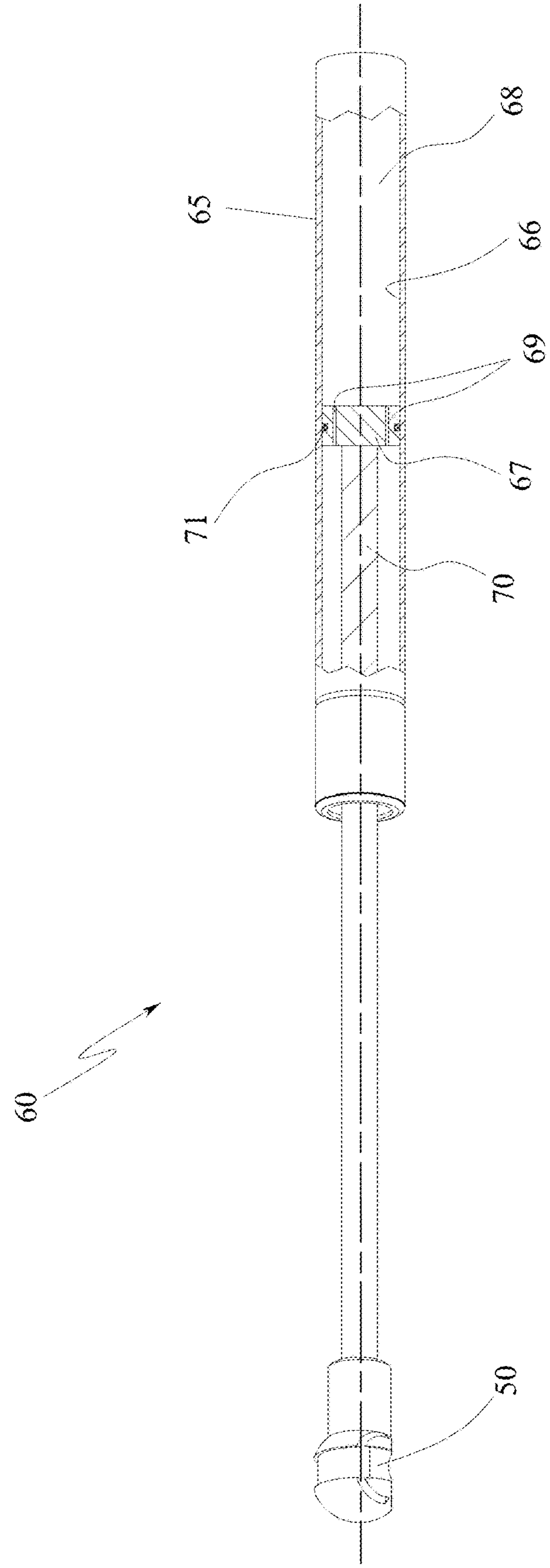
FIG. 21 is a partially sectioned schematic view of the elastic element of the door-closing device of FIG. 1 of FIG. 12.

FIG. 12 shows an apparatus for closing an opening of a refrigeration cabinet. The closing apparatus comprises at least one wing 30, but preferably two wings 30 each adapted to selectively occlude or disengage, at least partially, the access opening to the refrigerated compartment of the refrigeration cabinet.

Overall, access to the refrigerated compartment is completely prevented when all the wings 30 are in the closed position.

Each wing 30 comprises the panel 35, for example rectangular in shape, made of thermally insulating material.

The wing comprises a support frame 40 that supports and for example frames the panel 35.

Each wing 30 is hinged to the frame 25 according to a rotation axis R, for example parallel to a lying plane of the access opening 20, preferably vertical, by means of the door-closing device 450. Two door-closing devices 450, one for each wing 30 are envisaged. Similar to the door-closing device 45, the door-closing device 450 makes available the rotation axis R around which the wing 30 rotates and is also shaped so that the wing automatically moves towards the closed position when a user is not acting thereon. This automation takes place by means of an elastic element completely similar to the elastic element of the door-closing device 45.

The elastic element of the door-closing device 450 develops longitudinally along a respective longitudinal axis, is provided with a first axial end 50 and an opposite second axial end 55 and exerts an elastic force (only) along said longitudinal axis, in particular only in the direction of away-movement between said axial ends. Preferably the elastic element may be a gas spring 60 as described above.

The door-closing device 45 comprises a first fixing bracket 750 fixed (directly) to the frame 25, for example by means of threaded connection members.

The first bracket 75 is for example elongated in shape along a longitudinal axis L1 transverse (perpendicular) to the rotation axis R.

Said longitudinal axis is also parallel to a vertical lying plane of the opening of the refrigerated compartment, or in other words it is parallel to a vertical lying plane of the panel of the wing when the wing is in the closed position.

The first bracket 750 like the first bracket 75 of the door-closing device 45 comprises at least a portion shaped as a flat plate-shaped body with a first face 850 opposite a second face 900 and a perimeter edge that joins said two major faces; the two faces 850, 900 have similar dimensions and the plate-shaped body is substantially rectangular and perpendicular to the rotation axis R.

The first face 850 is at least partially in direct contact with the frame 25, i.e. it is in direct contact with a flat surface of the frame. The first bracket 750 does not comprise the through slots 80 of the first bracket 75

The first axial end 50 of the elastic element is hinged to the first bracket 750, according to a first hinge axis C1 parallel to the rotation axis R.

As well as the door-closing device 45, the door-closing device 450 comprises a first hinge pin 100 fixed to the first bracket 750 removably and in particular without residual degrees of freedom, which defines at least the hinge axis C1 parallel to the rotation axis R. In the illustrated embodiment, the first hinge pin comprises a spherical head in order to realise a spherical joint with a suitable spherical seat rigidly fixed to the first axial end of the elastic element.

The door-closing device 450, as well as the door-closing device 45, comprises a pin 115 rotatably associated with the first bracket 750 with respect to the rotation axis R. In particular, it is such a pin 115, i.e. a guiding cylinder made in the first bracket and in which said pin is inserted, forming a rotoidal coupling, which defines the rotation axis R around which the wing rotates with respect to the refrigerated compartment.

The pin preferably has a longitudinal extension such as to extend both above and below with respect to the first bracket 750 in the portion in which the guiding cylinder is made, preferably the pin extends above the first bracket at least in the portion in which the guiding cylinder is made and extends below at least a vertical height that is lower than the minimum vertical height of the first bracket.

The guiding cylinder of the pin 115 is made in a portion of the first bracket, which is eccentric with respect to the fixing seat of the first hinge pin.

The closing device 450 comprises an arm 1650 that develops starting from the pin 115, for example from the enlarged portion thereof, in the direction of movement away from the rotation axis R, for example perpendicularly thereto, and which is integral with the pin 115 rotatingly about the rotation axis R.

At one end of the arm 1650 distal from the pin 115 there is hinged the second axial end 55 of the elastic element according to a second hinge axis C2 which is parallel and eccentric to both the first rotation axis R and to the first hinge axis C1 in the arm.

The arm 1650 thus develops along its own longitudinal axis L2 transverse (perpendicular) to the rotation axis R. For example, the longitudinal axis of the arm can be drawn as a straight line perpendicular to the rotation axis R and to the second hinge axis C2.

The arm is shaped so as to make a rotation of at least 90° or 95° about the rotation axis R, between the open position and the closed position of the wing.

In the illustrated embodiment, when the wing 30 is in the closed position, the longitudinal axis L2 of the arm is substantially perpendicular to a lying plane of the opening of the refrigerated compartment.

Furthermore, again in the closed position the longitudinal axis L2 of the arm 1650 is substantially perpendicular to the longitudinal axis L1 of the first bracket 750.

In the open position of the wing, the longitudinal axis L2 of the arm is arranged at a certain angle with respect to the longitudinal axis L1 of the first bracket so that the hinge axis C2 falls outside the profile of the first bracket 750 in the space comprised between the wing 30 and the opening of the refrigerated compartment; in particular said angle is comprised between 5° and 20°, for example it is comprised between 10° and 7°.

The door-closing device 450, like the door-closing device 45, comprises a second fixing bracket 180 entirely similar to the fixing bracket 180 of the door-closing device 45.

Preferably, the gas spring 60 of the door-closing device 45,450 is arranged in use in an inclined manner with respect to a horizontal plane, i.e. the respective longitudinal axis in use is arranged in an inclined manner with respect to a horizontal plane.

In particular, a minimum distance H2 of the first axial end 50 of the gas spring from the first bracket 75,750, i.e. from a lying plane of the flat surface 90,900 of the first bracket 75,750, is less than a minimum distance H1 of the second axial end 55 of the gas spring.

For example, when in use, i.e. when the first bracket is fixed to the refrigerated compartment, in particular in a top portion of the refrigerated cabinet, the first axial end 50 of the gas spring is at a vertical height that is lower than a vertical height of the second axial end 55 of the gas spring.

In detail, the first bracket 75,750, to which the first axial end 50 of the gas spring 65 is hinged, and the arm 165,1650, to which the second axial end 55 is hinged, are configured in such a way that the first axial end 50 of the gas spring is at a vertical height H2 with respect to the flat surface 90,900 of the first bracket 75,750 that is lower than a vertical height H1 of the second axial end 55 of the gas spring. Further, the end 50 from which the rod 70 exits is placed at a height H2 that is lower than the opposite end 55.

The gas spring 65 comprises the cylinder 65, filled by the combination 68 of two fluids, nitrogen in gas form and oil in liquid phase; the cylinder 65 is provided with a constant cross-section (along the longitudinal axis of the spring itself), that is its inner surface 66, adapted to guide a piston 67 integral with the rod 70, has a constant cross-section (along the longitudinal axis of the spring itself) and does not have grooves.

Preferably, the piston 67 comprises holes 69 crossed by the combination 68 of oil and nitrogen in the step of extension of the rod 70 and in the step of compression thereof.

In particular, the piston 67 comprises at least one micro-hole, but preferably a plurality of microholes, crossed by oil and nitrogen in the step of extension of the rod and a pair of holes, which are wider than the at least one microhole, crossed by said fluids in the compression step.

Preferably, the piston 67 bears a gasket 71 arranged between the piston 67 and the inner surface 67 of the cylinder 65 and adapted to prevent the passage of the combination 68 of the two fluids between the piston 67 and the same inner surface 67; in this way, the combination 68 of the two fluids can only pass through the holes 69 and the at least one micro-hole.

Once the door-closing device 45,450 has been assembled between the respective wing 30 and the frame 25, when a user acts on the wing to bring it from the closed position to the open position, the plate 180, being integral with the wing, transmits the rotary motion to the pin 115 and consequently to the arm 165,1650, which compresses the elastic element in contrast to the force exerted by it, that is, in the direction of approach of the second axial end to the first axial end.

When the user releases the wing, the elastic element automatically pushes on the arm by rotating the pin 115 and consequently the plate 180, which carries the wing along with it towards the closed position.

The closing device is preferably configured so that when the wing is in the closed position the elastic element must not be in the resting condition, but must exert a thrust on the arm.

The invention thus conceived is susceptible to several modifications and variations, all falling within the scope of the inventive concept.

Moreover, all the details can be replaced by other technically equivalent elements.

In practice, the materials used, as well as the contingent shapes and sizes, can be whatever according to the requirements without for this reason departing from the scope of protection of the following claims.

The invention claimed is:

1. A door-closing device for refrigeration cabinets provided with a wing hinged to a refrigerated compartment, said door-closing device comprising:

- a first fixing bracket adapted to be fixed to the compartment,
- a second fixing bracket adapted to be fixed to the wing,
- a pin rotatably associated with the first fixing bracket with respect to a rotation axis and to which the second fixing bracket is rotationally integral, and
- an elastic element, which develops longitudinally along a longitudinal axis, is provided with a first axial end and an opposite second axial end and exerts an elastic force along said longitudinal axis,
- wherein the first axial end is hinged to the first fixing bracket according to a first hinge axis which is parallel and eccentric to the rotation axis of the pin, and wherein the second axial end is hinged, according to a second hinge axis, which is parallel and eccentric to the rotation axis of the pin, to an arm, which is rotationally integral with the pin about the rotation axis, characterized in that at least the portion of first fixing bracket in which the first axial end is hinged and the portion of first fixing bracket in which the pin of the arm is hinged are rigidly connected to each other without degrees of residual freedom,
- wherein the first axial end of the elastic element is hinged to the first fixing bracket by means of a first hinge pin and the first bracket comprises a first fixing seat of the first hinge pin and a second fixing seat of the first hinge pin symmetrical to the first seat with respect to a centerline plane (M) of the first fixing bracket, said first and second fixing seats being shaped to allow the removable fixing of the first hinge pin, wherein the first bracket comprises a first guiding cylinder of the pin of the arm and a second guiding cylinder of the pin of the arm symmetrical to the first guiding cylinder with respect to the centerline plane, said first guiding cylinder and second guiding cylinder being shaped to realize a rotoidal coupling with the pin of the arm defining the rotation axis, and wherein the first hinge pin is selectively fixable in the first fixing seat or in the second fixing seat and the pin of the arm is selectively insertable in the first guiding cylinder or in the second guiding cylinder.

2. A door-closing device according to claim 1, wherein the elastic element is a gas spring provided with a cylinder which realizes the second axial end and from which a rod exits which realizes the first axial end.

3. A door-closing device according to claim 1, wherein the first fixing seat and the second fixing seat each comprise a respective threaded hole into which a threaded portion of the first hinge pin is screwable.

4. A door-closing device according to claim 1, comprising a pin retaining element configured so as to maintain a portion of the pin inside the first guiding cylinder or the second guiding cylinder and which is configured to be removably associated with the first bracket at the first guiding cylinder or the second guiding cylinder.

5. A door-closing device according to claim 1, wherein the first bracket is provided with a plurality of through slots of elongated transverse shape and aligned along a straight direction.

6. A door-closing device according to claim 1, wherein, with said wing in the closed position, said arm is substantially perpendicular to said first bracket, while with said wing in the open position and arranged so as to realize an angle equal to or greater than 90° with the opening of the refrigerated compartment, the hinge axis between said arm and said second axial end of the elastic element falls on said first bracket.

7. A door-closing device according to claim 1, wherein, with said wing in the closed position, said arm is substantially perpendicular to said first bracket, while with said wing in the open position and arranged so as to realize an angle equal to or greater than 90° with the opening of the refrigerated compartment, the hinge axis between said arm and said second axial end of the elastic element falls outside the profile of said first bracket and in the space comprised between said opening of the refrigerated compartment and said wing.

8. A door-closing device according to claim 2, wherein said gas spring is arranged in an inclined manner with respect to a horizontal plane.

9. A door-closing device according to claim 8, wherein the first axial end of said gas spring is arranged at a height with respect to a flat surface of the first bracket that is lower than the height at which said second axial end is arranged.

10. A door-closing device according to claim 8, wherein said cylinder has an inner surface having a constant cross-section.

11. A door-closing device according to claim 10, wherein said rod is integral with a piston adapted to slide inside said cylinder, said piston bearing at least one hole and a gasket in contact with the inner surface of the cylinder so that the at least one fluid is configured to flow only inside said at least one hole and not between piston and cylinder.

12. A closing apparatus for a refrigeration cabinet provided with a refrigerated compartment, said apparatus comprising:

a frame adapted to be fixed to the refrigerated compartment and adapted to define an access opening to the refrigerated compartment itself, and a wing hinged according to a rotation axis to the frame by means of a door-closing device according to claim 1, wherein the first bracket is fixed to the frame, the second bracket is fixed to the wing and the rotation axis of the wing is defined by the rotation axis of the pin of the arm.

13. A refrigeration cabinet comprising a refrigerated compartment and a closing apparatus of the compartment according to claim 12, wherein the frame is fixed to the compartment.

* * * * *